(12) United States Patent
Koizumi et al.

(10) Patent No.: US 9,160,458 B2
(45) Date of Patent: Oct. 13, 2015

(54) OPTICAL SIGNAL DETECTION CIRCUIT AND OPTICAL RECEIVER

(75) Inventors: Hiroshi Koizumi, Kanagawa (JP); Masafumi Nogawa, Kanagawa (JP); Yusuke Ohtomo, Kanagawa (JP)

(73) Assignee: NIPPON TELEPHONE AND TELEGRAPH CORPORATION, Tokyo (JP)

( * ) Notice: Subject to any disclaimer, the term of this patent is extended or adjusted under 35 U.S.C. 154(b) by 167 days.

(21) Appl. No.: 13/981,313

(22) PCT Filed: Jan. 25, 2012

(86) PCT No.: PCT/JP2012/051526
§ 371 (c)(1),
(2), (4) Date: Oct. 1, 2013

(87) PCT Pub. No.: WO2012/102300
PCT Pub. Date: Aug. 2, 2012

(65) Prior Publication Data
US 2014/0016949 A1   Jan. 16, 2014

(30) Foreign Application Priority Data
Jan. 25, 2011   (JP) ................. 2011-012736

(51) Int. Cl.
*H04B 10/06* (2006.01)
*H04B 10/60* (2013.01)
*H04B 10/69* (2013.01)

(52) U.S. Cl.
CPC ............. *H04B 10/60* (2013.01); *H04B 10/69* (2013.01); *H04B 10/697* (2013.01)

(58) Field of Classification Search
CPC ............................. H04B 10/69; H04B 10/697
See application file for complete search history.

(56) References Cited

U.S. PATENT DOCUMENTS

| 4,688,260 | A | * | 8/1987 | Shutterly et al. ................ 398/62 |
| 5,875,049 | A | * | 2/1999 | Asano et al. ................... 398/202 |

(Continued)

FOREIGN PATENT DOCUMENTS

| JP | H08-070223 A | 3/1993 | |
| JP | 08-070223 | * 12/1996 | ................ H03F 3/45 |

(Continued)

*Primary Examiner* — Li Liu
(74) *Attorney, Agent, or Firm* — Blakely Sokoloff Taylor & Zafman LLP

(57) ABSTRACT

An optical signal detection circuit (10) includes an amplification circuit (11) that differentially amplifies an electrical signal (Tout) corresponding to the pulse train of an optical signal (Pin) and outputs a differential output signal (Aout), and a comparator (12) that compares the voltage value of the positive-phase signal of the differential output signal (Aout) with the voltage value of the negative-phase signal and outputs a pulsed comparison output signal (Cout) corresponding to the comparison result. The amplification circuit (11) includes a current addition circuit (11E) that adjusts a DC load current to generate a positive-phase signal (Aout+) and a negative-phase signal (Aout−) of the differential output signal (Aout) in accordance with an adjusted voltage value from an external adjusted voltage source (Vadj) and adjusts the DC bias of the positive-phase signal (Aout+) and the DC bias of the negative-phase signal (Aout−).

13 Claims, 10 Drawing Sheets

(56) References Cited

U.S. PATENT DOCUMENTS

| | | | |
|---|---|---|---|
| 5,892,609 A * | 4/1999 | Saruwatari | 398/202 |
| 7,307,569 B2 * | 12/2007 | Vrazel et al. | 341/144 |
| 7,868,701 B2 * | 1/2011 | Nakamura et al. | 330/308 |
| 2002/0167693 A1 * | 11/2002 | Vrazel et al. | 359/109 |
| 2003/0095315 A1 * | 5/2003 | Hoshide | 359/189 |
| 2005/0105913 A1 * | 5/2005 | Ozeki et al. | 398/140 |
| 2006/0216042 A1 * | 9/2006 | Yeo et al. | 398/209 |
| 2009/0297168 A1 * | 12/2009 | Miyata et al. | 398/198 |
| 2012/0251128 A1 * | 10/2012 | Ishii | 398/186 |
| 2014/0016949 A1 * | 1/2014 | Koizumi et al. | 398/212 |

FOREIGN PATENT DOCUMENTS

| | | | | |
|---|---|---|---|---|
| JP | 2007-005968 A | | 1/2007 | |
| JP | 2007-081599 A | | 3/2007 | |
| JP | 2009-044228 | * | 2/2009 | H03F 3/08 |
| JP | 2009-044228 A | | 2/2009 | |
| JP | 2011-166659 A | | 8/2011 | |

* cited by examiner

US 9,160,458 B2

OPTICAL SIGNAL DETECTION CIRCUIT AND OPTICAL RECEIVER

TECHNICAL FIELD

The present invention relates to an optical communication technology and, more particularly, to an optical signal detection technique capable of properly detecting the presence/absence of optical signal input.

BACKGROUND ART

In an optical receiver that receives an optical signal and obtains a reception output formed from an electrical signal, an optical signal detection circuit (SD: Signal Detect) that determines the presence/absence of optical signal input is used to prevent the optical receiver from outputting unwanted noise in the absence of an optical signal. The optical signal detection circuit generates an optical signal detection signal representing whether an optical signal having a sufficient strength is received, thereby detecting a communication error or performing squelch control to cut off noise output from a limiting amplifier LA under no-signal conditions.

FIG. 9 is a block diagram showing the arrangement of a conventional optical receiver (see, for example, patent literature 1). In an optical receiver 200, a photodiode PD photoelectrically converts an optical signal Pin formed from a pulse train into a photocurrent signal Iin. A transimpedance amplifier TIA serving as a preamplifier amplifies the photocurrent signal Iin and outputs an electrical signal Tout. The electrical signal Tout output from the transimpedance amplifier TIA is input to a limiting amplifier LA serving as a post-amplifier. The limiting amplifier LA amplifies the electrical signal Tout and outputs a reception output Rout having a predetermined amplitude with respect to the optical signals Pin of various strengths. A waveform shaping circuit such as a CDR (Clock Data Recovery) or a timing adjustment circuit is normally provided at the subsequent stage of the limiting amplifier LA so as to extract a clock signal from a data signal included in the reception output Rout or shape the signal waveform into a waveform easy to be handled as a digital signal.

The transimpedance amplifier TIA is AC-coupled to an optical signal detection circuit 20. A positive-phase signal Tout+ and a negative-phase signal Tout− of the electrical signal Tout are input to the optical signal detection circuit 20 via corresponding coupling capacitors C. The optical signal detection circuit 20 includes a comparator 21 that outputs a comparison output signal Cout only when the electrical signal Tout is received, and an SR latch 22 that holds the comparison output signal Cout and converts it into an optical signal detection signal SD formed from a DC signal. The SR latch 22 cancels holding of the optical signal detection signal SD in accordance with a reset signal RESET. For example, in burst communication represented by a PON system, a PON control IC can output the reset signal RESET at the end of burst packet reception.

For example, the optical signal detection signal SD is used for squelch control, and the squelch is closed during the time from reception of the reset signal RESET up to reception of the next burst signal. This makes it possible to prevent noise output from the limiting amplifier LA. When the next burst signal is received, the squelch can be opened to return to a normal reception state.

FIG. 10 is a circuit diagram showing the arrangement of the comparator 21 used in the optical signal detection circuit according to the related art. The comparator 21 includes a first-stage bias circuit 21A, a first-stage amplification circuit 21B, a first-stage emitter follower circuit 21C, and a next-stage amplification circuit 21D.

The first-stage bias circuit 21A AC-coupled to the transimpedance amplifier TIA includes resistors R21 and R22 and resistors R23 and R24, which divide a power supply potential Vcc. The first-stage bias circuit 21A gives a DC bias to each of the positive-phase signal Tout+ and the negative-phase signal Tout− of the electrical signal Tout whose DC components are cut by the corresponding coupling capacitors C. The biased positive-phase signal Tout+ and negative-phase signal Tout− are input to a pair of differential transistors Q21 and Q22 of the first-stage amplification circuit 21B, respectively.

The first-stage amplification circuit 21B differentially amplifies the positive-phase signal Tout+ and the negative-phase signal Tout− of the electrical signal Tout and outputs them to the next-stage amplification circuit 21D via the first-stage emitter follower circuit 21C.

In the first-stage amplification circuit 21B, when load resistors R25 and R26 of the pair of differential transistors Q21 and Q22 are made to have different values, the DC level of the output of the first-stage amplification circuit 21B has an offset voltage.

If the amplitudes of the positive-phase signal Tout+ and the negative-phase signal Tout− input to the first-stage amplification circuit 21B are small, the inverted output from the transistor Q21 and the noninverted output from the transistor Q22 do not cross due to the offset voltage, that is, the first-stage amplification circuit 21B does not form a differential signal. In this case, the next-stage amplification circuit 21D that receives the noninverted output and the inverted output from the first-stage amplification circuit 21B does not output the pulsed comparison output signal Cout.

On the other hand, if the amplitudes of the input positive-phase signal Tout+ and negative-phase signal Tout− are sufficiently large, the inverted output from the transistor Q21 and the noninverted output from the transistor Q22 cross regardless of the presence of the offset voltage. In this case, High level and Low level corresponding to the crossing alternately appear in the comparison output signal Cout output from the next-stage amplification circuit 21D.

The SR latch 22 holds the comparison output signal Cout. As a result, for example, at the same time as the start of reception of the optical signal Pin, High level is output as the optical signal detection signal SD representing the presence/absence of optical signal input. Once High level is detected as the comparison output signal Cout, the SR latch 22 holds and outputs the level as the optical signal detection signal SD, as a characteristic feature. It is therefore possible to implement the high-speed optical signal detection circuit 20 that immediately responds to signal reception.

RELATED ART LITERATURE

Patent Literature

Patent Literature 1: Japanese Patent Laid-Open No. 2009-044228

DISCLOSURE OF INVENTION

Problem to be Solved by the Invention

In the optical signal detection circuit 20, the detection sensitivity of the comparator 21 to the presence/absence of input of the optical signal Pin needs to be adjusted such that the comparator 21 outputs the comparison output signal Cout only when the electrical signal Tout from the transimpedance amplifier TIA includes significant pulses having an amplitude of a predetermined value or more.

The reason for this is as follows. If the detection sensitivity is too high, mixed noise is erroneously detected as significant pulses in a section without the burst signal. On the other hand, if the detection sensitivity is too low, detection delay occurs even when the burst signal is input.

In addition, when the temperature or the power supply potential Vcc varies, the characteristic of the photodiode PD or the transimpedance amplifier TIA varies, and the amplitude of the electrical signal Tout also varies. As a result, the detection sensitivity of the comparator 21 is influenced by the temperature or the power supply potential Vcc. It is therefore necessary to adjust the detection sensitivity of the comparator 21 in accordance with the temperature or the power supply potential Vcc.

As an arrangement to adjust the detection sensitivity of the comparator 21, an arrangement can be supposed which externally automatically adjusts the load resistance value of the amplification circuit provided in the comparator 21 in accordance with the temperature or the power supply potential Vcc.

FIG. 11 shows an example of the arrangement of a circuit for adjusting the detection sensitivity of the comparator. In this case, a variable resistor Radj for sensitivity adjustment is connected in parallel to a load resistor R29 out of the load resistors R29 and R30 of the next-stage amplification circuit 21D in the comparator 21. That is, one terminal of the variable resistor Radj is connected to the collector terminal of a transistor Q25 of the next-stage amplification circuit 21D, and the other terminal is connected to the power supply potential Vcc. The transistor Q25 and the load resistor R29 are used to amplify a negative-phase signal Fout− of a first-stage output signal Fout output from the first-stage emitter follower circuit 21C.

When the resistance value of the variable resistor Radj is changed, the load resistance value of the transistor Q25, which is formed from the combined resistance of the load resistor R29 and the variable resistor Radj, changes, and the DC level and amplitude of the comparison output signal Cout output from the collector terminal of the transistor Q25 change.

For example, the SR latch 22 determines the presence/absence of latch of the comparison output signal Cout based on the result of comparison between the threshold voltage at an input terminal S and the pulse amplitude of the comparison output signal Cout. For this reason, when the pulse amplitude of the comparison output signal Cout with respect to the threshold voltage of the SR latch 22 is adjusted, the detection sensitivity of the comparator 21 is adjusted consequently.

However, since the load resistance value of the transistor Q25 is the combined resistance value of the load resistor R29 and the variable resistor Radj, no linearity can be obtained between the variable resistor Radj and the detection sensitivity. It is therefore difficult to accurately adjust the detection sensitivity of the optical signal.

In addition, to obtain the comparison output signal Cout having an amplitude of sufficient magnitude, a differential amplification circuit may further be connected to the subsequent stage of the above-described next-stage amplification circuit 21D. The inverted output and the noninverted output obtained from the collector terminals of the transistors Q25 and Q26 included in the next-stage amplification circuit 21D are input to the differential amplification circuit arranged at the subsequent stage.

When the detection sensitivity adjustment example shown in FIG. 11 is applied to the circuit arrangement, the next-stage amplification circuit 21D adjusts not only the DC level but also the amplitude of the output signal from the transistor Q25 corresponding to the negative-phase signal Fout−. On the other hand, the amplitude of the output signal from the transistor Q26 corresponding to a positive-phase signal Fout+ is not adjusted. For this reason, the positive-phase signal and the negative-phase signal having different amplitudes are input to the differential amplification circuit arranged at the subsequent stage. As a result, no linearity can be obtained between the detection sensitivity of the comparator 21 and the temperature or the power supply potential Vcc, and it is difficult to accurately adjust the detection sensitivity of the optical signal.

The present invention has been made to solve the above-described problems, and has as its object to provide an optical signal detection technique capable of accurately adjusting the detection sensitivity of an optical signal.

Means of Solution to the Problem

In order to achieve the above-described object, an optical signal detection circuit according to the present invention is an optical signal detection circuit that detects the presence/absence of optical signal input based on a differential electrical signal obtained by photoelectrically converting the optical signal formed from a pulse train, comprising an amplification circuit that differentially amplifies the electrical signal input via a coupling capacitor and outputs pulses having an amplitude equal to or more than a reference value out of the electrical signal as a differential amplified output signal, a comparator that compares the voltage value of the positive-phase signal of the amplified output signal with the voltage value of the negative-phase signal and outputs the comparison result as a comparison output signal, and an analog holding circuit that charges a holding capacitor by pulses included in the pulsed comparison output signal and causes a discharging resistor to remove a DC voltage obtained by charge, thereby generating a holding output signal that changes in accordance with the presence/absence of optical signal input, the amplification circuit being provided with a current addition circuit that adjusts a DC load current used to differentially amplify the positive-phase signal and the negative-phase signal of the amplified output signal in accordance with an adjusted voltage value from an external adjusted voltage source, thereby adjusting the DC biases of the positive-phase signal and the negative-phase signal.

In other words, an optical signal detection circuit according to the present invention comprises an amplification circuit that differentially amplifies a positive-phase signal and a negative-phase signal of an electrical signal including pulses corresponding to a pulse train of an optical signal and outputs a differential output signal, a comparator that compares a voltage value of the positive-phase signal of the differential output signal with a voltage value of the negative-phase signal and outputs a pulsed comparison output signal corresponding to a comparison result, and a holding circuit that outputs an optical signal detection signal representing presence/absence of input of the optical signal based on the pulsed comparison output signal, the amplification circuit comprising first and second load resistors that have one-terminal sides connected to a power supply potential Vcc and generate the positive-phase signal and the negative-phase signal of the differential output signal, respectively, and a current addition circuit that adjusts a DC load current flowing to at least one of the first and second load resistors in accordance with an adjusted voltage value from an external adjusted voltage source and adjusts a difference between a DC bias of the positive-phase signal of the differential output signal and a DC bias of the negative-phase signal.

An optical receiver according to the present invention comprises a photoelectric conversion element that photoelectrically converts an optical signal formed from a pulse train and outputs a photocurrent signal, a transimpedance amplifier that amplifies the photocurrent signal and outputs an electrical signal including pulses corresponding to the pulse train, a limiting amplifier that amplifies the electrical signal and outputs a reception output including pulses having a predetermined amplitude, and an optical signal detection circuit that detects presence/absence of input of the optical signal based on the electrical signal, the optical signal detection circuit comprising an amplification circuit that differentially amplifies a positive-phase signal and a negative-phase signal of the electrical signal and outputs a differential output signal, a comparator that compares a voltage value of the positive-phase signal of the differential output signal with a voltage value of the negative-phase signal and outputs a pulsed comparison output signal corresponding to a comparison result, and a holding circuit that outputs an optical signal detection signal representing the presence/absence of input of the optical signal based on the pulsed comparison output signal, and the amplification circuit comprising first and second load resistors that have one-terminal sides connected to a power supply potential Vcc and generate the positive-phase signal and the negative-phase signal of the differential output signal, respectively, and a current addition circuit that adjusts a DC load current flowing to at least one of the first and second load resistors in accordance with an adjusted voltage value from an external adjusted voltage source and adjusts a difference between a DC bias of the positive-phase signal of the differential output signal and a DC bias of the negative-phase signal.

According to the present invention, a current addition circuit adjusts a DC load current flowing to at least one of first and second load resistors, thereby adjusting the difference between the DC bias of the positive-phase signal of a differential output signal and the DC bias of the negative-phase signal, that is, the offset voltage. At this time, the amplitudes of the positive-phase signal and the negative-phase signal are not changed by adjusting the difference between the DC bias of the positive-phase signal and the DC bias of the negative-phase signal. It is therefore possible to accurately adjust the detection sensitivity of the optical signal.

BEST MODE FOR CARRYING OUT THE INVENTION

The embodiments of the present invention will now be described with reference to the accompanying drawings.

First Embodiment

Figure 1:
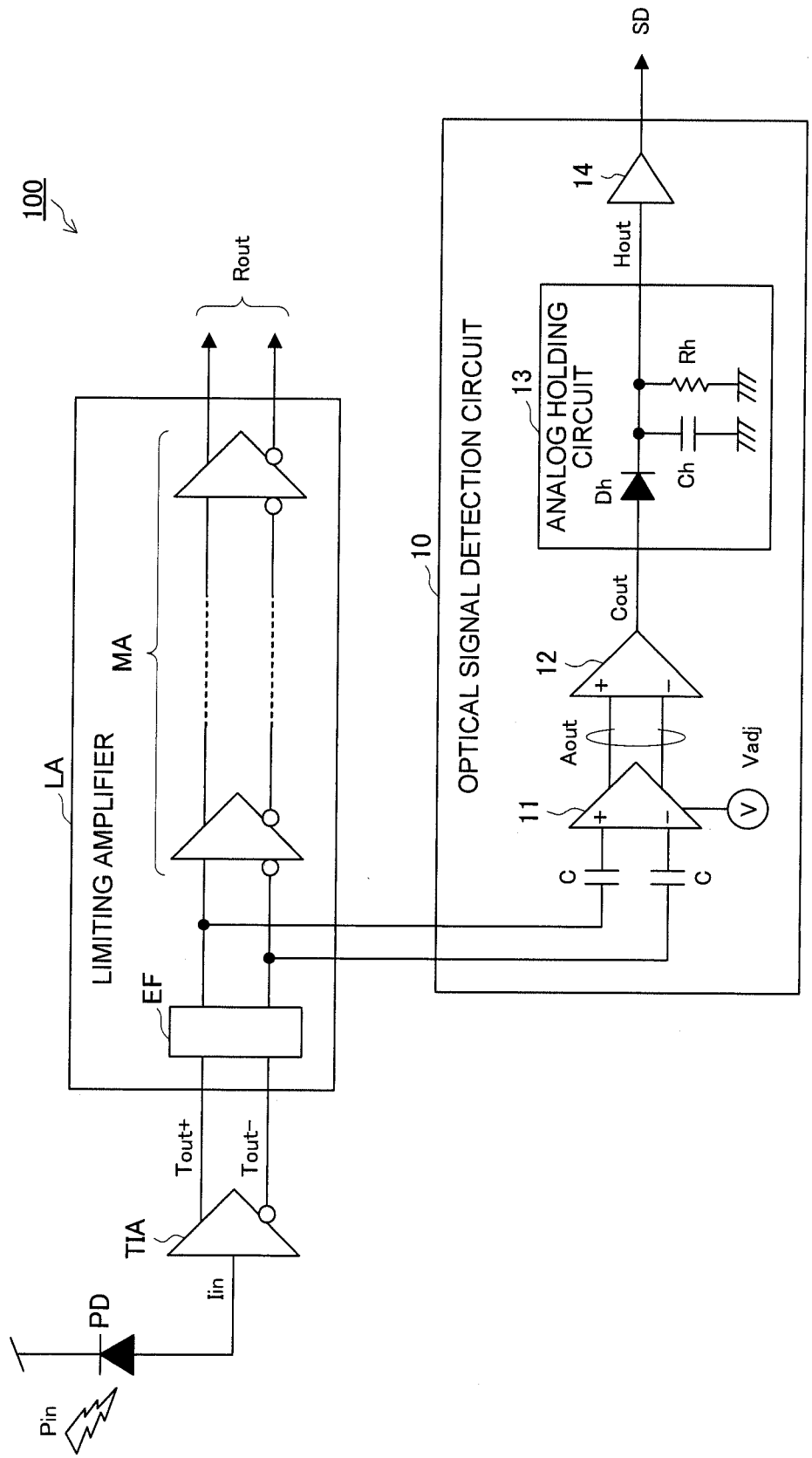
FIG. 1 is a block diagram showing the arrangement of an optical receiver and an optical signal detection circuit according to the first embodiment.

An optical receiver and an optical signal detection circuit according to the first embodiment of the present invention will be described first with reference to FIG. 1. FIG. 1 is a block diagram showing the arrangement of an optical receiver and an optical signal detection circuit according to the first embodiment.

An optical receiver 100 is a communication apparatus that converts an optical signal received via an optical fiber into an electrical signal and outputs it. The optical receiver 100 is used in an OLT (Optical Line Terminal) that accommodates a plurality of users on the station side in a PON (Passive Optical Network) method employed in, for example, an FTTH (Fiber To The Home) system.

The optical receiver 100 includes, as main circuit components, a photodiode PD, a transimpedance amplifier TIA, a limiting amplifier LA, and an optical signal detection circuit 10.

The photodiode PD is a photoelectric conversion element that photoelectrically converts an optical signal Pin formed from a pulse train and outputs a photocurrent signal Iin.

The transimpedance amplifier TIA amplifies the photocurrent signal Iin and outputs an electrical signal Tout including pulses corresponding to the pulse train of the optical signal Pin.

The limiting amplifier LA amplifies the electrical signal Tout output from the transimpedance amplifier TIA and outputs a reception output Rout including pulses having a predetermined amplitude. The limiting amplifier LA outputs the reception output Rout having a predetermined amplitude with respect to the optical signals Pin of various strengths.

The optical signal detection circuit 10 defects the presence/absence of optical signal input based on the electrical signal output from the transimpedance amplifier TIA.

In the optical receiver 100, the optical signal Pin formed from a pulse train that has arrived via an optical fiber is received by the photodiode PD and converted into the photocurrent signal Iin. The transimpedance amplifier TIA serving as a preamplifier amplifies the photocurrent signal Iin and outputs the electrical signal Tout. The electrical signal Tout is input to the limiting amplifier LA serving as a post-amplifier and the optical signal detection circuit 10.

The limiting amplifier LA is normally formed from multistage amplification circuits. To adjust the level, an amplification circuit of a preceding stage and an amplification circuit of a subsequent stage are often connected via an emitter follower circuit. Hence, the input stage is an amplification circuit or an emitter follower circuit. In the example shown in FIG. 1, the electrical signal Tout from the transimpedance amplifier TIA is input to a main amplification circuit group MA via a differential emitter follower circuit EF.

The output terminal of the transimpedance amplifier TIA and the input terminal of the limiting amplifier LA are connected by AC coupling or DC coupling.

Note that although not illustrated in FIG. 1, a waveform shaping circuit such as a CDR or a timing adjustment circuit is normally provided at the subsequent stage of the limiting amplifier LA. These circuits extract a clock signal from a data signal included in the reception output Rout or shape the signal waveform into a waveform easy to be handled as a digital signal.

[Optical Signal Detection Circuit]

On the other hand, the optical signal detection circuit 10 is a circuit portion that is connected in parallel to the limiting amplifier LA with respect to the transimpedance amplifier TIA and detects the presence/absence of input of the optical signal Pin based on the electrical signal from the transimpedance amplifier TIA.

The optical signal detection circuit 10 is AC-coupled to the transimpedance amplifier TIA via a coupling capacitor C.

The optical signal detection circuit 10 includes, as main circuit components, an amplification circuit 11, a comparator 12, an analog holding circuit 13, and an output buffer 14.

The amplification circuit 11 differentially amplifies a positive-phase signal Tout+ and a negative-phase signal Tout− of the electrical signal Tout from the transimpedance amplifier TIA, and outputs a differential output signal Aout. The amplification circuit 11 outputs the output signal (differential output signal) Aout having differential properties in correspondence with significant pulses having an amplitude of a predetermined value or more out of the electrical signal Tout from the transimpedance amplifier TIA, as will be described later.

The positive-phase signal Tout+ and the negative-phase signal Tout− from the transimpedance amplifier TIA are input to the amplification circuit 11 via coupling capacitors C for AC coupling. The capacitance of the coupling capacitor C is optimized in accordance with the bit rate of the reception signal. For example, when the bit rate is 10 Gbps, the capacitance is preferably about 1 pF or less.

The comparator 12 receives a positive-phase signal Aout+ and a negative-phase signal Aout− of the differential output signal Aout output from the amplification circuit 11, compares the voltage value of the positive-phase signal Aout+ of the differential output signal Aout with that of the negative-phase signal Aout−, and outputs a pulsed comparison output signal Cout corresponding to the comparison result. The comparison output signal Cout is a single-phase (single-end) signal. The comparison output signal Cout includes a pulsed signal when the electrical signal Tout from the transimpedance amplifier TIA includes significant pulses having an amplitude of a predetermined value or more.

Note that details of the internal arrangement of the amplification circuit 11 and the comparator 12 will be described later with reference to FIG. 2.

[Holding Circuit]

The analog holding circuit 13 and the output buffer 14 constitute a holding circuit that outputs an optical signal detection signal SD representing the presence/absence of input of the optical signal Pin based on the pulsed comparison output signal Cout.

The analog holding circuit 13 includes a holding capacitor Ch that is charged by the pulsed comparison output signal Cout output from the comparator 12, and a discharging resistor Rh connected in parallel to the holding capacitor Ch. The analog holding circuit 13 causes the discharging resistor Rh to remove charges held by the holding capacitor Ch, thereby outputting a holding output signal Hout that changes in accordance with the presence/absence of input of the optical signal Pin.

In this embodiment, the analog holding circuit 13 includes a diode Dh with an anode terminal connected to the output terminal of the comparator 12, as shown in FIG. 1. One terminal of the holding capacitor Ch is connected to the cathode terminal of the diode Dh, and the other terminal of the holding capacitor Ch is connected to a ground potential GND. Similarly, one terminal of the discharging resistor Rh is connected to the cathode terminal of the diode Dh, and the other terminal of the discharging resistor Rh is connected to the ground potential GND.

With this arrangement, the diode Dh extracts, out of the pulses included in the comparison output signal Cout output from the comparator 12, only pulses higher than the voltage across the holding capacitor Ch by the junction voltage of the diode Dh. In the analog holding circuit 13, the holding capacitor Ch is charged with the pulses rectified by the diode Dh. On the other hand, the discharging resistor Rh removes the charges held in the holding capacitor Ch, and the voltage across the holding capacitor Ch and the discharging resistor Rh which are connected in parallel with each other is output as the holding output signal Hout.

The pulses included in the comparison output signal Cout output from the comparator 12 correspond to the presence/absence of input of the optical signal formed from a pulse train. Hence, the holding output signal Hout of the analog holding circuit 13 is an analog DC voltage signal that changes in accordance with the presence/absence of input of the optical signal Pin. More specifically, in the presence of the optical signal Pin, the holding capacitor Ch is charged by the pulses input from the comparator 12, and the potential of the holding output signal Hout rises along with the elapse of time. In a case of loss of the optical signal Pin, pulse input from the comparator 12 stops. Hence, the holding capacitor Ch is discharged, and the potential of the holding output signal Hout lowers along with the elapse of time.

The output buffer 14 shapes the holding output signal Hout formed from the analog DC voltage generated by the analog holding circuit 13 into a digital logic signal used in a general logic gate by, for example, threshold processing, and outputs the optical signal detection signal SD representing the presence/absence of input of the optical signal Pin.

In this embodiment, the holding circuit that outputs the optical signal detection signal SD representing the presence/absence of input of the optical signal Pin based on the pulsed comparison output signal Cout output from the comparator 12 is constructed by the analog holding circuit 13 and the output buffer 14, thereby autonomously outputting the optical signal detection signal SD representing the loss of the optical signal Pin.

A time constant decided by the holding capacitor Ch and the discharging resistor Rh of the analog holding circuit 13 is decided in consideration of the balance between the response speed to detect the start of a burst signal input as the electrical signal Tout+ or Tout− and the tolerance to consecutive identical digits to prevent the circuit from erroneously determining a consecutive identical digit section included in the burst signal as signal loss.

In principle, the holding output signal Hout of the analog holding circuit 13 holds High level at the time of reception of the optical signal Pin, and changes to Low level at the time of loss of the optical signal. Hence, the logic of the optical signal detection signal SD can also comply with this. At this time, for example, if the optical signal detection signal SD should indicate a signal loss by High level, the logic is configured to change the optical signal detection signal SD to High level when the holding output signal Hout is at Low level.

Figure 3:
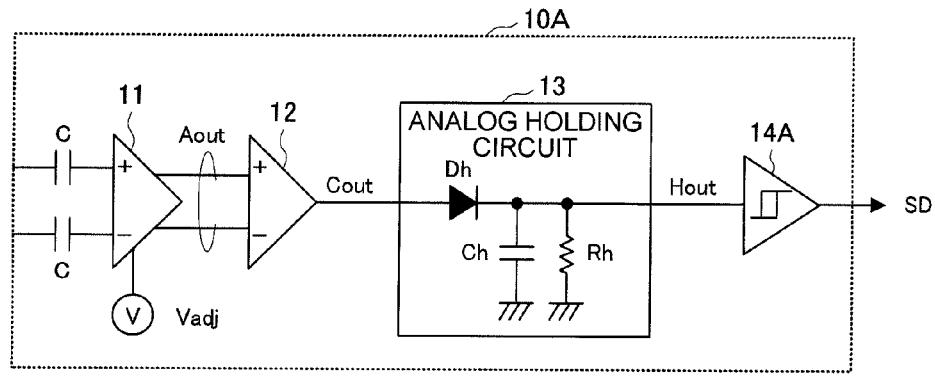
FIG. 3 is a block diagram showing a modification of a holding circuit used in the optical receiver and the optical signal detection circuit according to the first embodiment.

Note that as a modification of the holding circuit according to this embodiment, a Schmitt trigger inverter 14A may be used in place of the output buffer 14, as shown in FIG. 3.

The level of the holding output signal Hout output from the analog holding circuit 13 changes slowly as compared to the change of the comparison output signal Cout. For this reason, if the level of the output is switched based on one logic level, so-called chattering may occur so that the output logic level oscillates near the threshold.

Using the Schmitt trigger inverter 14A makes it possible to prohibit SD indication when the output level of the holding output signal Hout is not sufficiently low, and after SD indication, cancel the SD indication only when the analog holding circuit 13 has output a sufficiently high potential.

Such a hysteresis can also be implemented by a hysteresis comparator using an operational amplifier, which can be used in place of the Schmitt trigger inverter 14A. However, since the slew rate (maximum response speed) of an operational amplifier is generally as low as 100 V/ms, the Assert/Deassert time representing the response of the SD undesirably becomes too long to implement high-speed response. In addition, when the hysteresis comparator is used, a reference voltage needs to be input separately.

[Amplification Circuit and Comparator]

Figure 4:
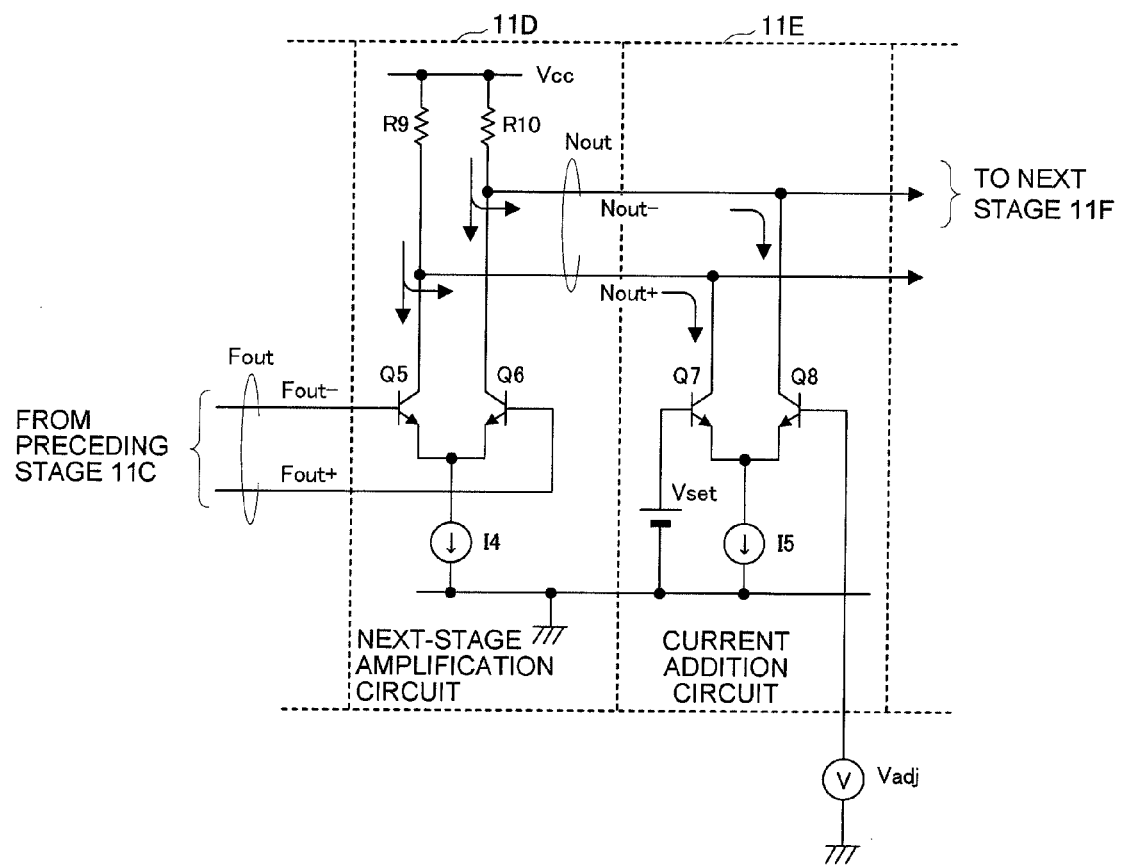
FIG. 4 is a circuit diagram showing the main part of the amplification circuit used in the optical receiver and the optical signal detection circuit according to the first embodiment.

The internal arrangement of the amplification circuit 11 and the comparator 12 used in the optical signal detection circuit 10 according to this embodiment will be described next in detail with reference to FIGS. 2 and 4.

Figure 2:
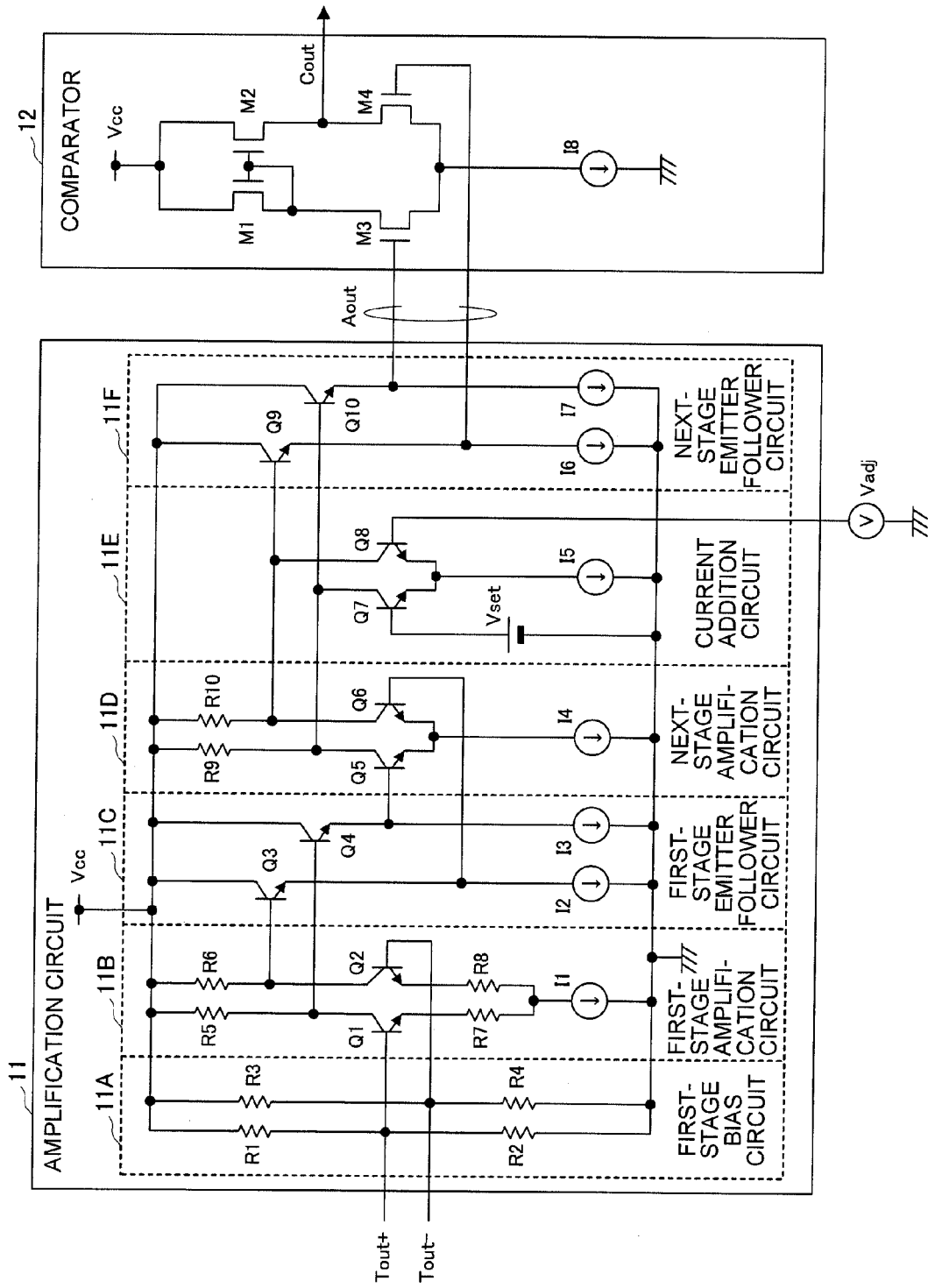
FIG. 2 is a circuit diagram showing an example of the arrangement of a comparator and an amplification circuit used in the optical receiver and the optical signal detection circuit according to the first embodiment.

FIG. 2 is a circuit diagram showing an example of the arrangement of the amplification circuit 11 and the comparator 12 used in the optical signal detection circuit 10 according to the first embodiment. FIG. 4 is a circuit diagram showing the main part of the amplification circuit 11.

The optical signal detection circuit of the present invention gives a DC bias difference to the positive-phase signal and the negative-phase signal and determines the presence/absence of a reception signal based on whether the comparator circuit of the subsequent stage can be driven. Hence, to adjust the detection sensitivity, it is important to change only the DC bias of the detection target signal by the amplification circuit 11.

The amplification circuit 11 includes a first load resistor R9 and a second load resistor R10 which have one-terminal sides connected to a power supply potential Vcc and generate the positive-phase signal Aout+ and the negative-phase signal Aout− of the differential output signal Aout, respectively, and a current addition circuit 11E that adjusts a DC load current flowing to at least one of the first load resistor R9 and the second load resistor R10 in accordance with an adjusted voltage value Vadj from an external adjusted voltage source and thus adjusts the difference between the DC bias of the positive-phase signal Aout+ of the differential output signal Aout and the DC bias of the negative-phase signal Aout−.

More specifically, the amplification circuit 11 includes a first-stage bias circuit 11A, a first-stage amplification circuit (anterior amplification circuit) 11B, a first-stage emitter follower circuit 11C, a next-stage amplification circuit (posterior amplification circuit) 11D, the current addition circuit 11E, and a next-stage emitter follower circuit 11F. These circuits are integrated on a semiconductor chip.

The first-stage bias circuit 11A includes a resistance dividing circuit formed from resistive elements R1 and R3 pulled up to the power supply potential Vcc (first power supply potential) and resistive elements R2 and R4 pulled down to the ground potential GND (second power supply potential). The first-stage bias circuit 11A gives DC biases according to the resistance ratio of the resistive elements R1 and R3 and that of the resistive elements R2 and R4 to the positive-phase signal Tout+ and the negative-phase signal Tout− of the electrical signal Tout input via the coupling capacitors C, respectively. Actually, the resistance ratio of the resistive elements R1 and R3 and that of the resistive elements R2 and R4 are made equal, thereby giving equal DC biases to the positive-phase signal Tout+ and the negative-phase signal Tout− of the electrical signal Tout.

The first-stage amplification circuit 11B is an amplification circuit that differentially amplifies the positive-phase signal Tout+ and the negative-phase signal Tout− of the electrical signal Tout and outputs a first-stage output signal.

The first-stage amplification circuit 11B is a differential amplification circuit including, for example, transistors Q1 and Q2 that form a differential pair, a resistive element R5 connected between the power supply potential Vcc and the collector terminal of the transistor Q1, a resistive element R6 connected between the power supply potential Vcc and the collector terminal of the transistor Q2, resistive elements R7 and R8 connected in series between the emitter terminals of the transistors Q1 and Q2, and a constant current source I1 connected between the ground potential GND and the node of the resistive elements R7 and R8.

The resistive elements R5 and R6 correspond to the load resistors of the differential amplification circuit that constitutes the first-stage amplification circuit 11B. In the first embodiment, different resistance values are set in the resistive elements R5 and R6. It is therefore possible to give an offset voltage between the differential outputs from the collector terminals of the transistors Q1 and Q2, that is, the negative-phase signal and the positive-phase signal of the first-stage output signal.

The first-stage emitter follower circuit 11C is an impedance adjustment circuit that has an output impedance lower than that of the first-stage amplification circuit 11B and outputs the first-stage output signal from the first-stage amplification circuit 11B.

The first-stage emitter follower circuit 11C can be formed from, for example, two transistors Q3 and Q4 having base terminals connected to the collector terminals of the differential transistors Q1 and Q2 of the first-stage amplification circuit 11B and collector terminals connected to the power supply potential Vcc, and constant current sources I2 and I3 connected between the ground potential GND and the emitter terminals of the transistors Q3 and Q4.

The first-stage emitter follower circuit 11C has an output impedance lower than that of the first-stage amplification circuit 11B, and outputs the positive-phase signal and the negative-phase signal of the first-stage output signal of the first-stage amplification circuit 11B, which are input to the base terminals of the transistors Q3 and Q4, respectively. The first-stage output signal of the first-stage amplification circuit 11B, which is output via the first-stage emitter follower circuit 11C, will be referred to as a "first-stage output signal Fout" hereinafter.

The next-stage amplification circuit 11D is an amplification circuit that differentially amplifies a positive-phase signal Fout+ and a negative-phase signal Fout− of the first-stage output signal Fout and outputs a differential output signal Nout.

The next-stage amplification circuit 11D is a differential amplification circuit formed from, for example, transistors Q5 and Q6 that form a differential pair, a resistive element R9 (first load resistor) connected between the power supply potential Vcc and the collector terminal of the transistor Q5, a resistive element R10 (second load resistor) connected between the power supply potential Vcc and the collector terminal of the transistor Q6, and a constant current source I4 connected between the ground potential GND and the node of the emitter terminals of the transistors Q5 and Q6. The next-stage amplification circuit 11D differentially amplifies the positive-phase signal Fout+ and the negative-phase signal Fout− of the first-stage output signal Fout, which are input to the base terminals of the transistors Q5 and Q6, and outputs the next-stage amplified signal Nout.

The current addition circuit 11E is a circuit that adjusts the DC load current flowing to at least one of the first load resistor R9 and the second load resistor R10 of the next-stage amplification circuit 11D in accordance with the adjusted voltage value Vadj from the external adjusted voltage source, and thus adjusts the difference between the DC bias of the positive-phase signal Aout+ of the differential output signal Aout and the DC bias of the negative-phase signal Aout−, that is, the offset voltage.

The current addition circuit 11E includes, for example, a transistor Q7 (first transistor) that has a collector terminal (first input/output terminal) connected to the other terminal of the first load resistor R9 of the next-stage amplification circuit 11D, that is, the collector terminal of the transistor Q5 of the next-stage amplification circuit 11D, and a base terminal (control terminal) receiving a predetermined voltage value Vset, a second transistor Q8 that has a collector terminal connected to the other terminal of the second load resistor R10, that is, the collector terminal of the transistor Q6, a base terminal receiving the adjusted voltage value Vadj, and an emitter terminal connected to the emitter terminal (second input/output terminal) of the first transistor Q7, and forms a differential pair with the first transistor Q7, and a constant current source I5 connected to the node between the emitter terminal (second input/output terminal) of the first transistor Q7 and the emitter terminal of the second transistor Q8.

More specifically, the current addition circuit 11E can be formed from the transistor Q7 (first transistor) having the collector terminal connected to the collector terminal (positive-phase signal Nout+) of the transistor Q5, the transistor Q8 (second transistor) that forms a differential pair with the transistor Q7 and has the collector terminal connected to the collector terminal (negative-phase signal Nout−) of the transistor Q6, the constant current source I5 connected between the ground potential GND and the node of the emitter terminals of the transistors Q7 and Q8, the set voltage source Vset connected between the ground potential GND and the base terminal of the transistor Q7, and the adjusted voltage source Vadj externally connected between the ground potential GND and the base terminal of the transistor Q8.

The current addition circuit 11E adds a current corresponding to the difference between the adjusted voltage source Vadj and the set voltage source Vset to the DC load currents flowing to the load resistors R9 and R10 of the next-stage amplification circuit 11D. When the DC load currents flowing to the load resistors R9 and R10 of the next-stage amplification circuit 11D are increased by the current addition circuit 11E, the DC biases of the positive-phase signal Nout+ and the negative-phase signal Nout− of the next-stage amplified signal Nout lower.

In the current addition circuit 11E, the constant current source I5 is commonly connected to the emitter terminals of the transistors Q7 and Q8 that form a differential pair. For this reason, the total current pulled in the transistors Q7 and Q8 has a predetermined magnitude. The current pulled in the transistors Q7 and Q8 is distributed in accordance with the voltage difference between the set voltage source Vset and the adjusted voltage source Vadj.

Hence, the difference between the decrease amount of the DC bias of the positive-phase signal Nout+ of the next-stage amplified signal Nout and the decrease amount of the DC bias of the negative-phase signal Nout−, that is, the magnitude of the offset voltage can be adjusted by adjusting the adjusted voltage source Vadj.

The next-stage emitter follower circuit 11F is an impedance adjustment circuit formed from transistors Q9 and Q10 having emitter terminals connected to the power supply potential Vcc, and constant current sources I6 and I7 connected between the ground potential GND and the collector terminals of the transistors Q9 and Q10, respectively. The next-stage emitter follower circuit 11F outputs the negative-phase signal Nout− and the positive-phase signal Nout+ of the next-stage amplified signal Nout of the next-stage amplification circuit 11D, which are input to the base terminals of the transistors Q9 and Q10, as the differential output signal Aout including the negative-phase signal Aout− and the positive-phase signal Aout+.

Note that the first-stage emitter follower circuit 11C and the next-stage emitter follower circuit 11F are provided based on the requirement in circuit implementation to adjust the output impedance, and are not indispensable for achieving the object of the present invention.

The comparator 12 is a voltage comparison circuit formed from, for example, two MOSFETs M1 and M2 that have drain terminals connected to the power supply potential Vcc and gate terminals connected to each other, and form a differential pair, a MOSFET M3 having a gate terminal receiving the positive-phase signal Aout+ and a drain terminal connected to the source terminal of the MOSFET M1 and the gate terminals of the MOSFETs M1 and M2, a MOSFET M4 having a gate terminal receiving the negative-phase signal Aout− and a drain terminal connected to the source terminal of the MOSFET M2, and a constant current source I8 connected between the ground potential GND and the node of the source terminals of the MOSFETs M3 and M4.

The comparator 12 compares the voltage value of the positive-phase signal Aout+ of the differential output signal Aout output from the next-stage emitter follower circuit 11F of the amplification circuit 11 and the voltage value of the negative-phase signal Aout−, and outputs the single-phase (single-end) comparison output signal Cout representing the comparison result from the drain terminal of the MOSFET M4.

Note that in the first embodiment, an example has been described in which the so-called BiCMOS circuit technology is used so that the amplification circuit 11 is formed from bipolar transistors, and the comparator 12 is formed from CMOSFETs. However, the present invention is not limited to this. For example, the amplification circuit 11 may partially or wholly be formed from MOSFETs.

[Operation of Optical Signal Detection Circuit According to First Embodiment]

The operation of the optical signal detection circuit 10 according to this embodiment will be described next with reference to FIGS. 1 to 4.

The burst signal (electrical signal Tout) input from the transimpedance amplifier TIA is input to the amplification circuit 11 via the coupling capacitors C as a differential waveform and differentially amplified by the first-stage amplification circuit 11B. At this time, since different resistance values according to the reference value are set as the resistance values of the resistive elements R5 and R6, an offset voltage corresponding to the reference value is given between the DC bias of the negative-phase signal Fout− out of the first-stage output signal Fout and the DC bias of the positive-phase signal Fout+.

The thus obtained first-stage output signal Fout is input to the next-stage amplification circuit 11D via the first-stage emitter follower circuit 11C and differentially amplified.

The current addition circuit 11E adds a current corresponding to the potential difference between the set voltage source Vset and the adjusted voltage source Vadj to the DC load currents of the resistive element R9 (first load resistor) and the resistive element R10 (second load resistor) in the next-stage amplification circuit 11D. For example, when the adjusted voltage value of the adjusted voltage source Vadj is made smaller than the set voltage value of the set voltage source Vset, the increase amount of the DC load current flowing to the resistive element R9 becomes larger than the increase amount of the DC load current flowing to the resistive element R10 in accordance with the difference between the voltage values. Hence, the DC bias of the positive-phase signal Nout+ becomes lower than the DC bias of the negative-phase signal Nout−.

The next-stage amplified signal Nout that has undergone the DC bias adjustment by the current addition circuit 11E is output as the differential output signal Aout via the next-stage emitter follower circuit 11F.

The offset voltage between the positive-phase signal Aout+ and the negative-phase signal Aout− of the differential output signal Aout, that is, the degree of overlap between the signals changes in accordance with the voltage difference between the set voltage source Vset and the adjusted voltage source Vadj of the current addition circuit 11E.

After that, the cross period of the differential output signal Aout is detected by the comparator 12. The comparison output signal Cout having pulses corresponding to the cross period is output from the comparator 12 to the analog holding circuit 13.

At this time, when the amplitude of the differential output signal Aout has a sufficient magnitude as compared to the offset voltage, the positive-phase signal Aout+ and the negative-phase signal Aout− of the differential output signal Aout cross. Hence, the comparator 12 outputs the pulsed comparison output signal Cout in accordance with the period during which the potential of the positive-phase signal Aout+ and the potential of the negative-phase signal Aout− are inverted.

Conversely, when the amplitude of the differential output signal Aout does not have a sufficient magnitude as compared to the offset voltage, the positive-phase signal Aout+ and the negative-phase signal Aout− of the differential output signal Aout do not cross. Hence, the comparator 12 does not output the pulsed comparison output signal Cout.

As described above, according to the optical signal detection circuit of the first embodiment, the adjusted voltage value of the adjusted voltage source Vadj of the current addition circuit 11E is adjusted, thereby adjusting the difference between the DC bias of the positive-phase signal Aout+ of the differential output signal Aout and the DC bias of the negative-phase signal Aout−, that is, the offset voltage. This changes the degree of overlap between the two signals and thus changes the cross period of the two signals. It is therefore possible to adjust the detection sensitivity of the optical signal Pin.

That is, the detection sensitivity of the optical signal Pin can be adjusted by adjusting the adjusted voltage value of the adjusted voltage source Vadj. Hence, when the electrical signal Tout includes significant pulses having an amplitude of a predetermined value or more, the comparator 12 outputs the pulsed comparison output signal Cout. On the other hand, even if noise having an amplitude less than the value is mixed in a section without the burst signal, it is possible to avoid the noise from being erroneously detected as significant pulses.

At this time, the DC bias of the positive-phase signal Aout+ and the DC bias of the negative-phase signal Aout− linearly change with respect to the adjusted voltage value of the adjusted voltage source Vadj. When the adjusted voltage value is changed, the DC biases of the positive-phase signal Aout+ and the negative-phase signal Aout− change, though the amplitudes of the signals do not change. For this reason, when automatic adjustment is performed externally in accordance with the temperature or the power supply potential Vcc, the DC bias of the positive-phase signal Aout+ and that of the negative-phase signal Aout− can accurately be adjusted.

The comparison output signal Cout thus generated by the comparator 12 is input to the analog holding circuit 13. Out of the pulses included in the comparison output signal Cout, those in a signal section where the voltage is higher than the DC voltage of the holding capacitor Ch by the diode junction voltage are extracted by the diode Dh and charge the holding capacitor Ch.

The voltage value of the DC voltage of the holding capacitor Ch, that is, the holding output signal Hout increases due to charge by the pulses having an amplitude equal to or more than the reference value out of the burst signal of the optical signal Pin. In a signal loss section without the burst signal, a consecutive identical digit section without the pulse signal out of the burst signal, and a pulse section where the amplitude is less than the reference value, the voltage value decreases due to discharge by the discharging resistor Rh. Note that in the signal loss section without the burst signal, the voltage of the holding output signal Hout does not lower up to the ground potential GND because the DC bias is applied to the comparison output signal Cout.

As described above, the time constant of the holding capacitor Ch and the discharging resistor Rh is decided in consideration of the balance between the response speed to detect the start of the burst signal and the tolerance to consecutive identical digits to prevent the circuit from erroneously determining a consecutive identical digit section included in the burst signal as signal loss.

When the burst signal is input, the holding output signal Hout changes from Low level without the burst signal to High level indicating the presence of the burst signal due to the pulses included in the burst signal in a time shorter than 100 ns defined as the response time. When a consecutive identical digit section included in the burst signal has come, the holding output signal Hout lowers its level due to the pulse loss but is held at High level indicating the presence of the burst signal, that is, at a threshold Hth or more only during about 13 nsec corresponding to the consecutive identical digit section.

Hence, when the burst signal is input, the optical signal detection signal SD representing detection of the optical signal Pin can be output within a predetermined response time. Even if a consecutive identical digit section is included in the burst signal, the optical signal detection signal SD representing detection of the optical signal Pin can be held and output without erroneously outputting the optical signal detection signal SD representing signal loss.

Figure 5:
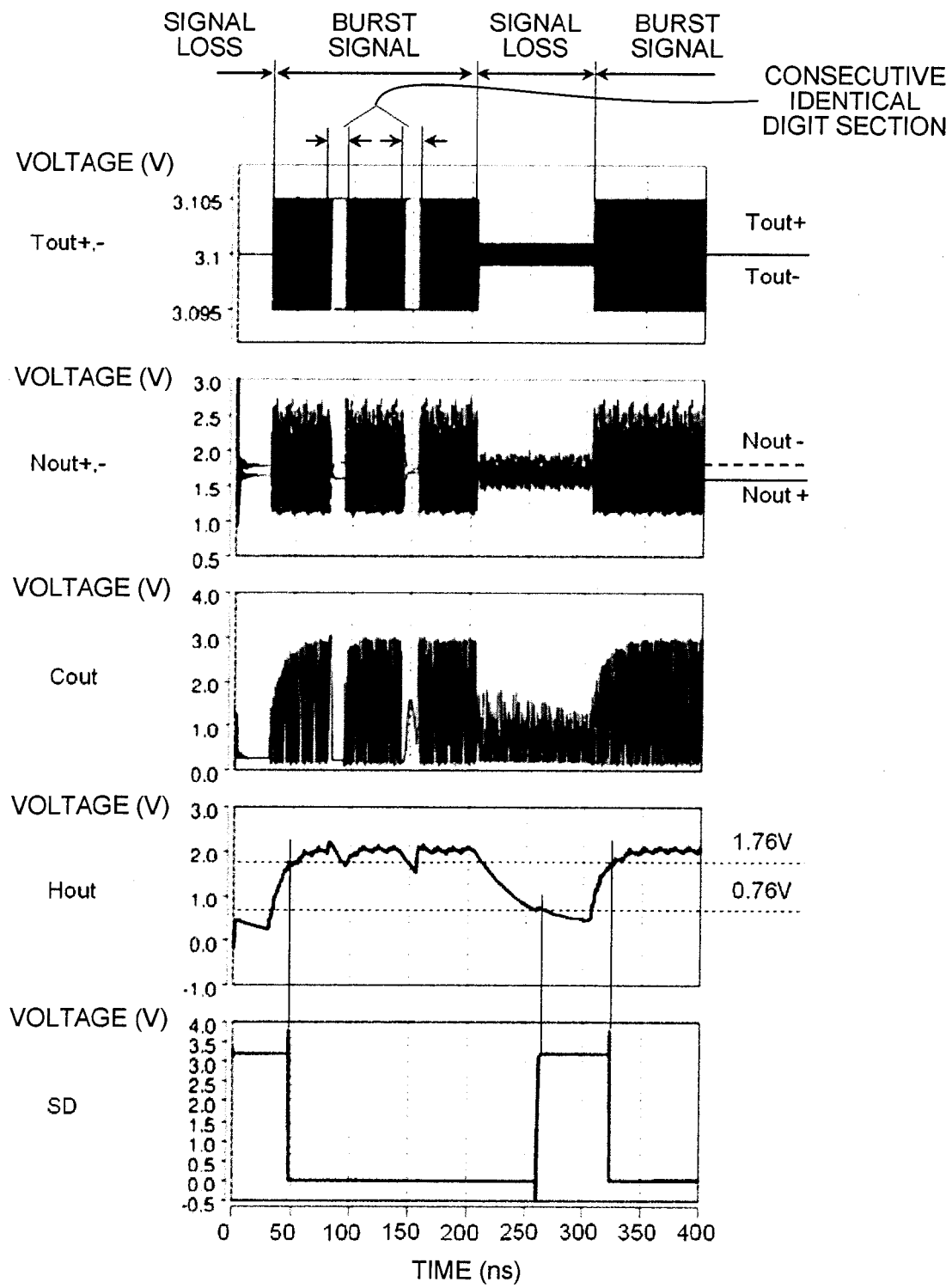
FIG. 5 is a timing chart showing the operation of the optical signal detection circuit according to the first embodiment.

FIG. 5 is a timing chart showing the operation of the optical signal detection circuit according to the first embodiment.

In this case, the system to which the optical receiver 100 including the optical signal detection circuit 10 is applied is assumed to be 10G-EPON. The electrical signal Tout input as the burst signal is a PN7 signal having a bit rate of 10 Gbps. The burst signal has an amplitude of about 10 mV (amplitude of about 20 mV as a differential signal). The amplitude of 10 mV corresponds to the output amplitude for the minimum reception sensitivity (about −30 dBm) of a general transimpedance amplifier TIA. In this case, assume that noise is mixed into the burst signal in the signal loss section, and its amplitude is about 2 mV.

The burst signal includes a consecutive identical digit section of, for example, 130 bits, that is, about 13 nsec, and the response time to detect the start of the burst signal is 100 ns or less. The capacitance value of the holding capacitor Ch of the analog holding circuit 13 is 1 pF, and the resistance value of the discharging resistor Rh is 25 kΩ. Note that the power supply potential Vcc is 3.3 V, and the ground potential GND is 0 V.

A DC offset of about 0.2 V is added to the positive-phase signal Nout+ and the negative-phase signal Nout− of the next-stage amplified signal Nout. As shown in FIG. 3, the Schmitt trigger inverter 14A is used in place of the output buffer 14.

As shown in FIG. 5, the comparison output signal Cout from the comparator 12 stops in the consecutive identical digit section. However, the holding output signal Hout does not invert the logic of the Schmitt trigger inverter 14A due to the droop (discharge) time of the analog holding circuit 13. Hence, the optical signal detection signal SD maintains Low level and continuously indicates the signal detection state.

After that, in a burst off state, the holding output signal Hout of the analog holding circuit 13 starts lowering. About 55 ns after the start, the optical signal detection signal SD changes to High level to indicate a signal loss.

Using the Schmitt trigger inverter 14A, the optical signal detection signal SD changes from Low level to High level when the holding output signal Hout reaches about 0.76 V. Reversely, the optical signal detection signal SD changes from High level to Low level again when the holding output signal Hout reaches about 1.76 V.

An operation error due to consecutive identical digits or noise input can be prevented by giving a hysteresis of 1 V to the determination logic of the optical signal detection signal SD.

According to the related art, a response time of several hundred ns to several ms is necessary to detect LOS (Loss Of Signal). However, according to the optical signal detection circuit 10 of this embodiment, the optical signal detection signal SD indicates LOS in about 55 ns regardless of the high signal bit rate of 10 Gbps. Signal detection is faster, and detection is indicated in about 18 ns.

This agility of response is an important characteristic to use the optical signal detection circuit 10 not as an alarm but as a sensor. For example, the international standard of the preamble length of the physical layer of 10G-EPON is 1,200 ns. The response time of 18 ns is much shorter. Hence, signal reception can autonomously be detected from the sleep state and used to issue a trigger to activate the circuit.

Effects of First Embodiment

As described above, according to this embodiment, in the optical signal detection circuit 10, the amplification circuit 11 that differentially amplifies the positive-phase signal Tout+ and the negative-phase signal Tout− of the electrical signal Tout input via the coupling capacitors C and outputs the differential output signal Aout includes the current addition circuit 11E. The DC load currents flowing to the first load resistor R9 and the second load resistor R10, which generate the positive-phase signal Aout+ and the negative-phase signal Aout− of the differential output signal Aout, respectively, are adjusted in accordance with the adjusted voltage value from the external adjusted voltage source Vadj, thereby adjusting the difference between the DC bias of the positive-phase signal Aout+ and the DC bias of the negative-phase signal Aout−.

More specifically, the current addition circuit 11E is provided with the first transistor Q7 having the collector terminal connected to one terminal of the first load resistor R9 used to amplify the positive-phase signal Aout+ of the differential output signal Aout and the base terminal receiving the set voltage value from the set voltage source Vset, the second transistor Q8 that forms a differential pair with the first transistor and has the collector terminal connected to one terminal of the second load resistor R10 used to amplify the negative-phase signal Aout− of the differential output signal Aout and the base terminal receiving the adjusted voltage value from the adjusted voltage source Vadj, and the constant current source I5 connected to the node between the emitter terminals of the first transistor Q7 and the second transistor Q8.

The DC bias of the positive-phase signal Aout+ of the differential output signal Aout and the DC bias of the negative-phase signal Aout− linearly change with respect to the adjusted voltage value of the adjusted voltage source Vadj. When the adjusted voltage value is changed, the DC biases of the positive-phase signal Aout+ and the negative-phase signal Aout− are adjusted, through the amplitudes of these signals do not change. For this reason, when automatic adjustment is performed externally in accordance with the temperature or the power supply potential Vcc, the DC bias of the positive-phase signal Aout+ and that of the negative-phase signal Aout− can accurately be adjusted. It is therefore possible to accurately detect the optical signal Pin.

In this embodiment, in the optical signal detection circuit 10, the amplification circuit 11 outputs, as the differential output signal Aout, significant pulses having an amplitude of a predetermined value or more out of the differential electrical signal Tout input from the transimpedance amplifier TIA via the coupling capacitors C. The comparator 12 compares the voltage values of the positive-phase signal Aout+ and the negative-phase signal Aout− of the differential output signal Aout and outputs the comparison result as the comparison output signal Cout. The analog holding circuit 13 charges the holding capacitor with the pulses included in the comparison output signal Cout, and removes, by the discharging resistor Rh, the DC voltage obtained by charge, thereby generating the holding output signal Hout that changes in accordance with the presence/absence of optical signal input. Hence, the circuit can autonomously operate without the necessity of an external control signal such as a reset signal and properly detect the presence/absence of optical signal input.

Since a control signal such as a reset signal need not be input from the outside of the optical signal detection circuit 10, the circuit can easily be applied to an optical receiver without the function of outputting such a control signal, and high versatility can be obtained. In addition, since a circuit unit for outputting such a control signal can be removed from the optical receiver, cost reduction can be implemented.

In this embodiment, the analog holding circuit 13 accumulates the pulses included in the burst signal, thereby detecting the presence/absence of optical signal input. For this reason, even when noise is input at the time of loss of the optical signal Pin, any operation error caused by this can be avoided, and a stable optical signal detection operation can be implemented.

Additionally, in this embodiment, the analog holding circuit 13 is formed from the diode Dh that rectifies the pulses included in the comparison output signal Cout, the holding capacitor Ch that accumulates the rectified pulses, and the discharging resistor Rh that removes the DC voltage obtained by charge. For this reason, the holding output signal that changes in accordance with the presence/absence of optical signal input can be generated by a very small circuit scale. The time constant of the holding capacitor Ch and the discharging resistor Rh can be decided in accordance with the target FTTH system in consideration of the balance between the response speed to detect the start of a burst signal and the tolerance to consecutive identical digits to prevent the circuit from erroneously determining a consecutive identical digit section included in the burst signal as signal loss.

In this embodiment, the amplification circuit 11 is provided with two differential amplification circuits that are cascade-connected. In the first-stage amplification circuit 11B located at the preceding stage out of the differential amplification circuits, the two load resistors R5 and R6 corresponding to the negative-phase signal Fout− and the positive-phase signal Fout+, respectively, and having different resistance values according to the reference value differentially amplify the negative-phase signal and the positive-phase signal, thereby applying an offset voltage according to the reference value between the DC bias of the negative-phase signal and the DC bias of the positive-phase signal. The next-stage amplification circuit 11D located posterior to the first-stage amplification circuit 11B differentially amplifies the negative-phase signal Fout− and the positive-phase signal Fout+ and outputs a differential output signal. For this reason, even when noise is input at the time of loss of the optical signal Pin, pulses having an amplitude less than the reference value can be removed.

Note that in the present invention, the two load resistors R5 and R6 of the first-stage amplification circuit 11B can have the same resistance value. In this case as well, the sensitivity can be adjusted by DC load current adjustment by the current addition circuit 11E.

In this embodiment, a latch circuit may be connected in place of the output buffer 14. The latch circuit can be expected to be hardly affected by noise, as compared to an arrangement in which the latch circuit is directly connected to the comparator output. However, even when the holding output signal Hout has changed to Low level, the latch output does not change. Hence, a reset signal is separately required. Using the latch circuit makes it possible to avoid "chattering" with which the determination result is hardly fixed, although a reset signal is separately required.

Second Embodiment

Figure 6:
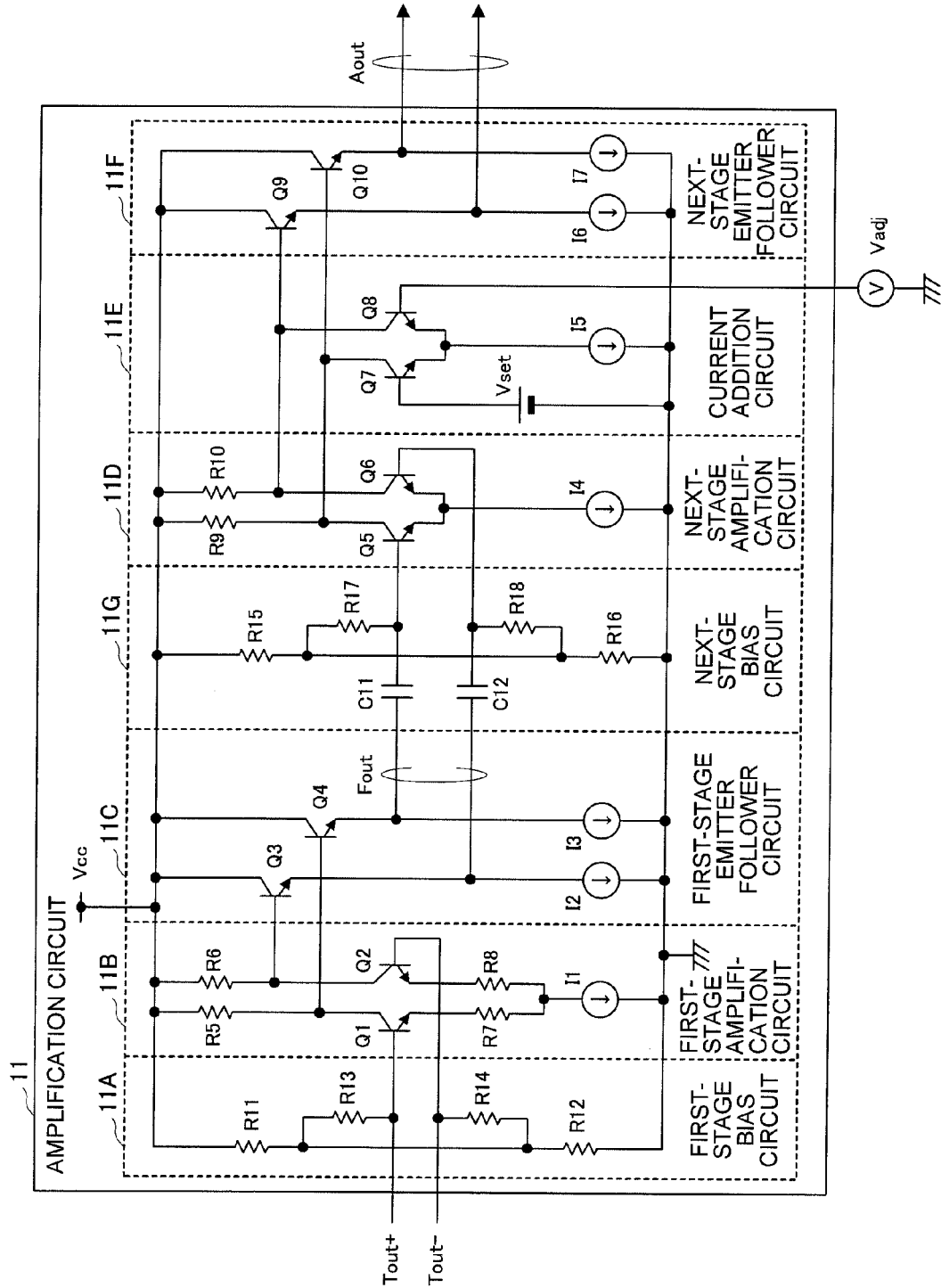
FIG. 6 is a circuit diagram showing an example of the arrangement of an amplification circuit used in an optical signal detection circuit according to the second embodiment.

An optical signal detection circuit 10 according to the second embodiment of the present invention will be described next with reference to FIG. 6. FIG. 6 is a circuit diagram showing an example of the arrangement of an amplification circuit used in the optical signal detection circuit according to the second embodiment.

In the first embodiment, a case has been described in which the first-stage bias circuit 11A of the amplification circuit 11 gives DC biases generated by the resistance dividing circuit using the resistive elements R1 to R4 to the positive-phase signal Tout+ and the negative-phase signal Tout− of the electrical signal Tout.

In the second embodiment, a case will be described in which an amplification circuit 11 is provided with a next-stage bias circuit 11G, and a first-stage emitter follower circuit 11C and a next-stage amplification circuit 11D are disconnected in a DC manner.

Note that the circuits other than the amplification circuit 11 are the same as in the first embodiment and denoted by the same reference numerals, and the a detailed description thereof will be omitted.

As shown in FIG. 6, the amplification circuit 11 used in the optical signal detection circuit according to this embodiment includes a first-stage bias circuit 11A that gives DC biases to a positive-phase signal Tout+ and a negative-phase signal Tout− of an electrical signal Tout, a first-stage amplification circuit 11B that differentially amplifies the biased positive-phase signal Tout+ and negative-phase signal Tout− and outputs a first-stage output signal Fout, the first-stage emitter follower circuit 11C that has an output impedance lower than that of the first-stage amplification circuit 11B and outputs the first-stage output signal Fout from the first-stage amplification circuit, the next-stage bias circuit 11G that is AC-coupled to the first-stage emitter follower circuit 11C by coupling capacitors C11 and C12, gives DC biases to a positive-phase signal Fout+ and a negative-phase signal Fout− of the first-stage output signal Fout input via the coupling capacitors C11 and C12, and outputs the signals, the next-stage amplification circuit 11D that differentially amplifies the positive-phase signal Fout+ and the negative-phase signal Fout− of the first-stage output signal Fout DC-biased by the next-stage bias circuit 11G and outputs a differential output signal Aout, and a current addition circuit 11E that adjusts DC load currents flowing to load resistors R9 and R10 of the next-stage amplification circuit 11D in accordance with an adjusted voltage value from an external adjusted voltage source Vadj and adjusts the difference between the DC bias of a positive-phase signal Aout+ and the DC bias of a negative-phase signal Aout− of the differential output signal Aout, that is, the offset voltage.

In this embodiment, the first-stage bias circuit 11A is formed from a resistive element R11 pulled up to a power supply potential Vcc, a resistive element R12 pulled down to a ground potential GND, a resistive element R13 connected between the middle point of a resistance dividing circuit formed from the resistive elements R11 and R12 and the base terminal of a transistor Q1, and a resistive element R14 connected between the middle point and the base terminal of a transistor Q2. The first-stage bias circuit 11A gives DC biases according to the resistance ratio of the resistive elements R11 and R12 to the positive-phase signal Tout+ and the negative-phase signal Tout− of the electrical signal Tout input from a transimpedance amplifier TIA via coupling capacitors C, respectively.

The next-stage bias circuit 11G is formed from a resistive element R15 pulled up to the power supply potential Vcc, a resistive element R16 pulled down to the ground potential GND, a resistive element R17 connected between the middle point of a resistance dividing circuit formed from the resistive elements R15 and R16 and the base terminal of a transistor Q5, a resistive element R18 connected between the middle point and the base terminal of a transistor Q6, the coupling capacitor C11 connected between the emitter terminal of a transistor Q4 and the base terminal of the transistor Q5, and the coupling capacitor C12 connected between the emitter terminal of a transistor Q3 and the base terminal of the transistor Q6. The next-stage bias circuit 11G gives DC biases according to the resistance ratio of the dividing resistors R15 and R16 to the negative-phase signal Fout− and the positive-phase signal Fout+ of the first-stage output signal Fout for the first-stage emitter follower circuit 11C input via the coupling capacitors C11 and C12, respectively.

Since the amplification circuit 11 of an optical signal detection circuit 10 amplifies a weak signal, the magnitude of the difference between the DC bias of the positive-phase signal Tout+ of the electrical signal Tout and the DC bias of the negative-phase signal Tout−, that is, the offset voltage greatly affects the detection sensitivity. Hence, if the resistance values of the resistive elements included in the resistance dividing circuit varies, the balance between the DC bias of the positive-phase signal Tout+ of the electrical signal Tout and the DC bias of the negative-phase signal Tout− may be lost.

In this embodiment, as shown in FIG. 6, the first-stage bias circuit 11A gives DC biases generated by the resistance dividing circuit formed from the set of resistive elements R11 and R12 to the electrical signals Tout+ and Tout− via the resistive elements R13 and R14, respectively. This makes it possible to suppress the balance between the DC bias of the positive-phase signal Tout+ of the electrical signal Tout and the DC bias of the negative-phase signal Tout− from being lost due to the variation in the resistive elements. Note that in this circuit arrangement, since the positive-phase signal Tout+ and the negative-phase signal Tout− of the electrical signal Tout are short-circuited via the resistive elements R13 and R14, the resistive elements R13 and R14 preferably have a sufficiently large resistance value of, for example, 10 kΩ or more.

In this embodiment, the next-stage bias circuit 11G AC-couples the first-stage emitter follower circuit 11C and the next-stage amplification circuit 11D and, like the first-stage bias circuit 11A, and gives DC biases generated by one resistance dividing circuit formed from the set of the resistive elements R15 and R16 to the negative-phase signal Fout− and the positive-phase signal Fout+ of the first-stage output signal Fout via the resistive elements R17 and R18, respectively.

This makes it possible to suppress loss of the balance between the DC bias of the positive-phase signal Fout+ of the first-stage output signal Fout and the DC bias of the negative-phase signal Fout− caused in the first-stage amplification circuit 11B. Note that in this circuit arrangement, since the negative-phase signal Fout− and the positive-phase signal Fout+ of the first-stage output signal Fout are short-circuited via the resistive elements R17 and R18, the resistive elements R17 and R18 preferably have a sufficiently large resistance value of, for example, 10 kΩ or more.

Effects of Second Embodiment

As described above, according to this embodiment, the next-stage bias circuit 11G is provided between the first-stage emitter follower circuit 11C and the next-stage amplification circuit 11D. The negative-phase signal Fout− and the positive-phase signal Fout+ of the first-stage output signal Fout from the first-stage emitter follower circuit 11C are input to the next-stage amplification circuit 11D via the coupling capacitors C11 and C12, respectively.

Even when the elements included in the first-stage amplification circuit 11B have variations, the DC components of the positive-phase signal Fout+ and the negative-phase signal Fout− of the first-stage output signal Fout input to the next-stage amplification circuit 11D are removed. Hence, the loss of the balance between the DC bias of the positive-phase signal Fout+ of the first-stage output signal Fout and the DC bias of the negative-phase signal Fout− caused by the variations between the elements can be suppressed.

Additionally, in each of the first-stage bias circuit 11A and the next-stage bias circuit 11G, one resistance dividing circuit (bleeder resistance) is used, and voltages divided by the resistance dividing circuit are applied to the positive-phase signal and the negative-phase signal of the input signal via high resistances, respectively.

Since this can suppress generation of an offset in the bias circuit, stable and accurate sensitivity adjustment can be performed even when the gain of the first-stage bias circuit 11A is made large.

Third Embodiment

Figure 7:
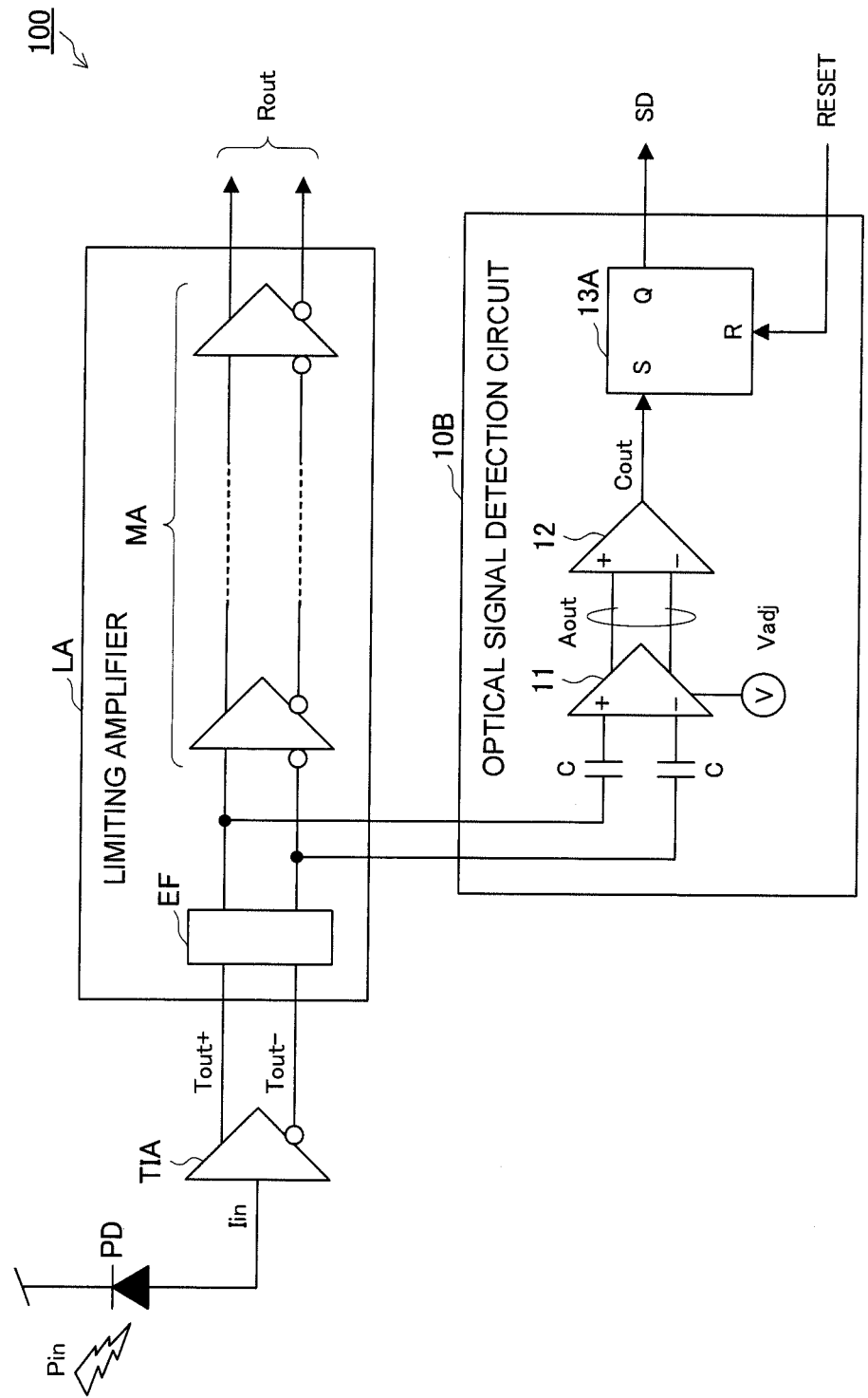
FIG. 7 is a block diagram showing the arrangement of an optical receiver and an optical signal detection circuit according to the third embodiment.

An optical signal detection circuit 10B according to the third embodiment of the present invention will be described next with reference to FIG. 7.

In the first and second embodiments, a case has been exemplified in which in the optical signal detection circuit 10, the analog holding circuit 13 holds the pulsed comparison output signal Cout output from the comparator 12, and the output buffer 14 generates the optical signal detection signal SD based on the holding output signal Hout. In the third embodiment, an example will be described in which in place of the analog holding circuit 13 and the output buffer 14, a latch circuit 13A is used as a holding circuit that outputs an optical signal detection signal SD representing the presence/absence of an optical signal Pin based on a comparison output signal.

Note that except that the holding circuit is formed from the latch circuit 13A, the other circuits included in the optical signal detection circuit 10B and an optical receiver 100 are the same as in the first embodiment and denoted by the same reference numerals, and the a detailed description thereof will be omitted.

In this embodiment, the optical signal detection circuit 10B is provided with the latch circuit 13A at the subsequent stage of a comparator 12. The latch circuit 13A is formed from, for example, an SR latch, holds a pulsed comparison output signal Cout output from the comparator 12, and outputs it as the optical signal detection signal SD. The optical signal detection signal SD is canceled by an externally input a reset signal RESET.

The latch circuit 13A that holds the pulse signal included in the pulsed comparison output signal Cout obtained by the comparator 12 continuously outputs High level as the comparison output signal Cout until the reset signal RESET is input. Hence, the latch circuit 13A continuously outputs High level as the comparison output signal Cout, for example, immediately after the start of reception of the optical signal Pin.

The arrangement of an amplification circuit 11 and the comparator 12 included in the optical signal detection circuit 10B according to this embodiment is the same as in the first embodiment.

Hence, as in the first embodiment, the amplification circuit 11 of the optical signal detection circuit 10B is provided with a current addition circuit 11E. DC load currents used to differentially amplify a positive-phase signal Aout+ and a negative-phase signal Aout− of an differential output signal Aout are adjusted in accordance with an adjusted voltage value from an external adjusted voltage source Vadj to adjust the DC bias of the positive-phase signal Aout+ and the DC bias of the negative-phase signal Aout−.

For this reason, even with the circuit arrangement that causes the latch circuit 13A to latch the comparison output signal Cout, when performing external adjustment in accordance with a temperature or a power supply potential Vcc, the DC bias of the positive-phase signal Aout+ and that of the negative-phase signal Aout− can correctly be adjusted, as in the circuit arrangement that causes the analog holding circuit 13 to hold the comparison output signal Cout. This makes it possible to detect the optical signal Pin at a high accuracy.

Fourth Embodiment

Figure 8:
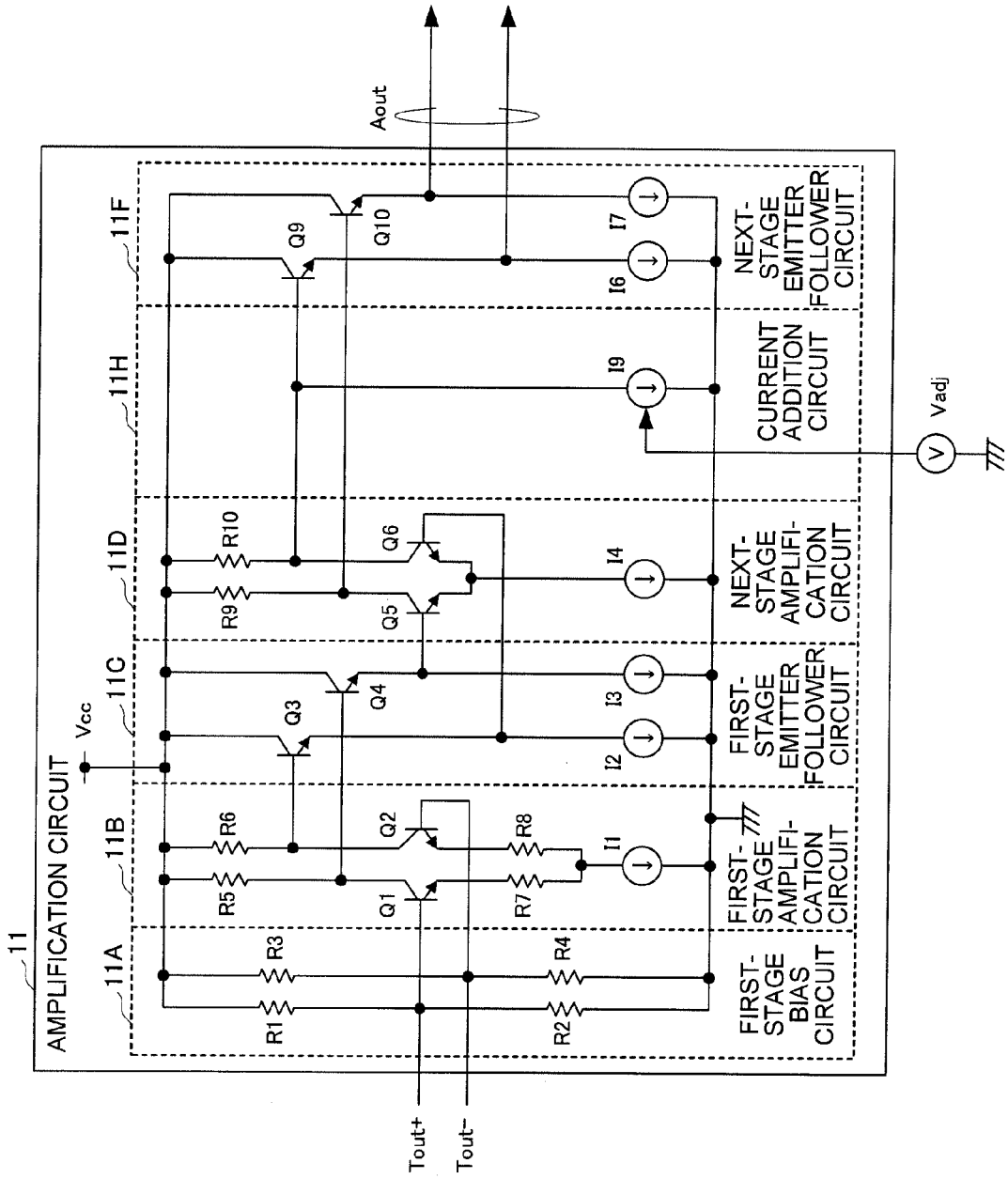
FIG. 8 is a circuit diagram showing an example of the arrangement of an amplification circuit used in an optical signal detection circuit according to the fourth embodiment.
Figure 9:
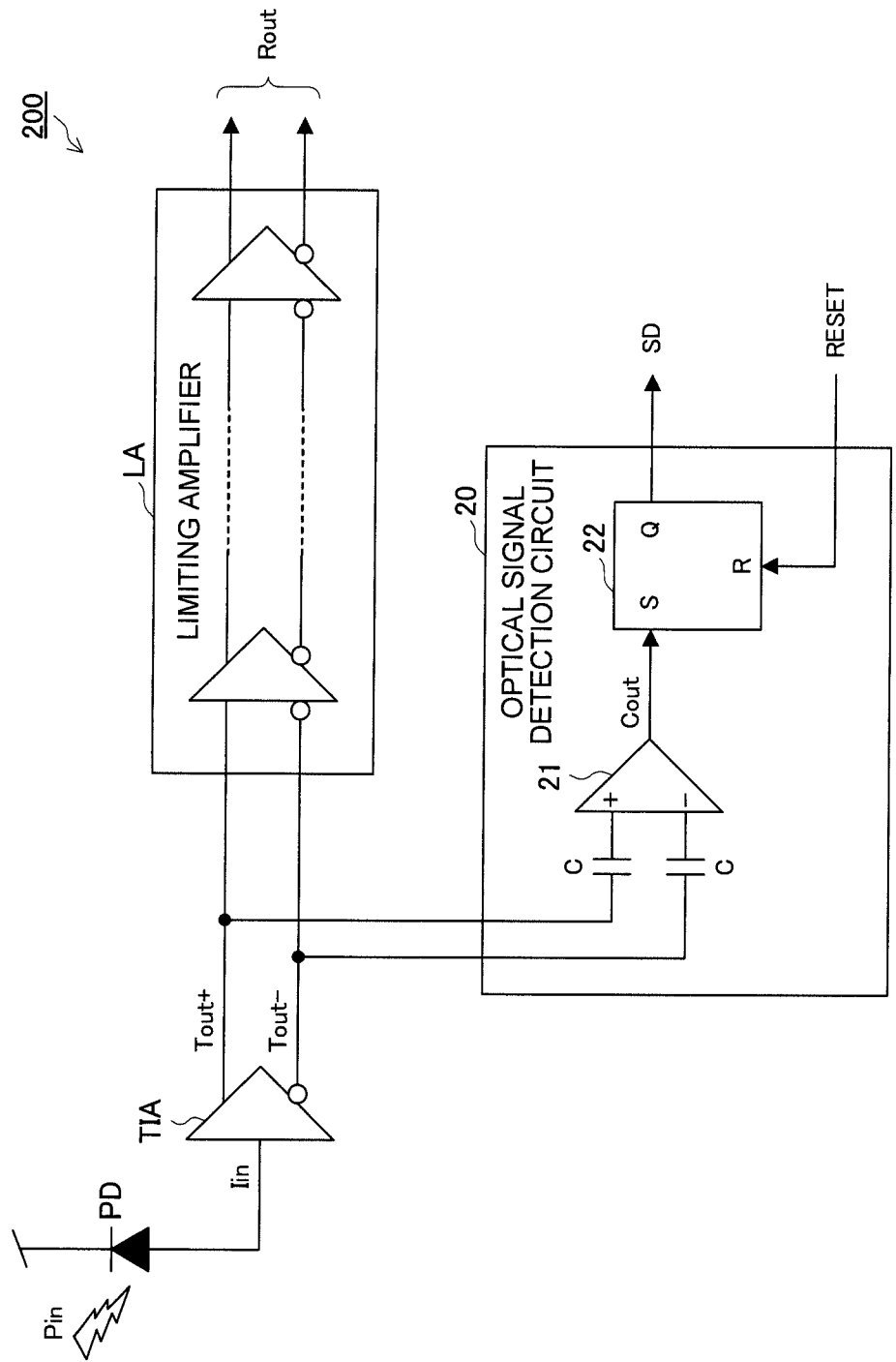
FIG. 9 is a block diagram showing the arrangement of a conventional optical receiver.
Figure 10:
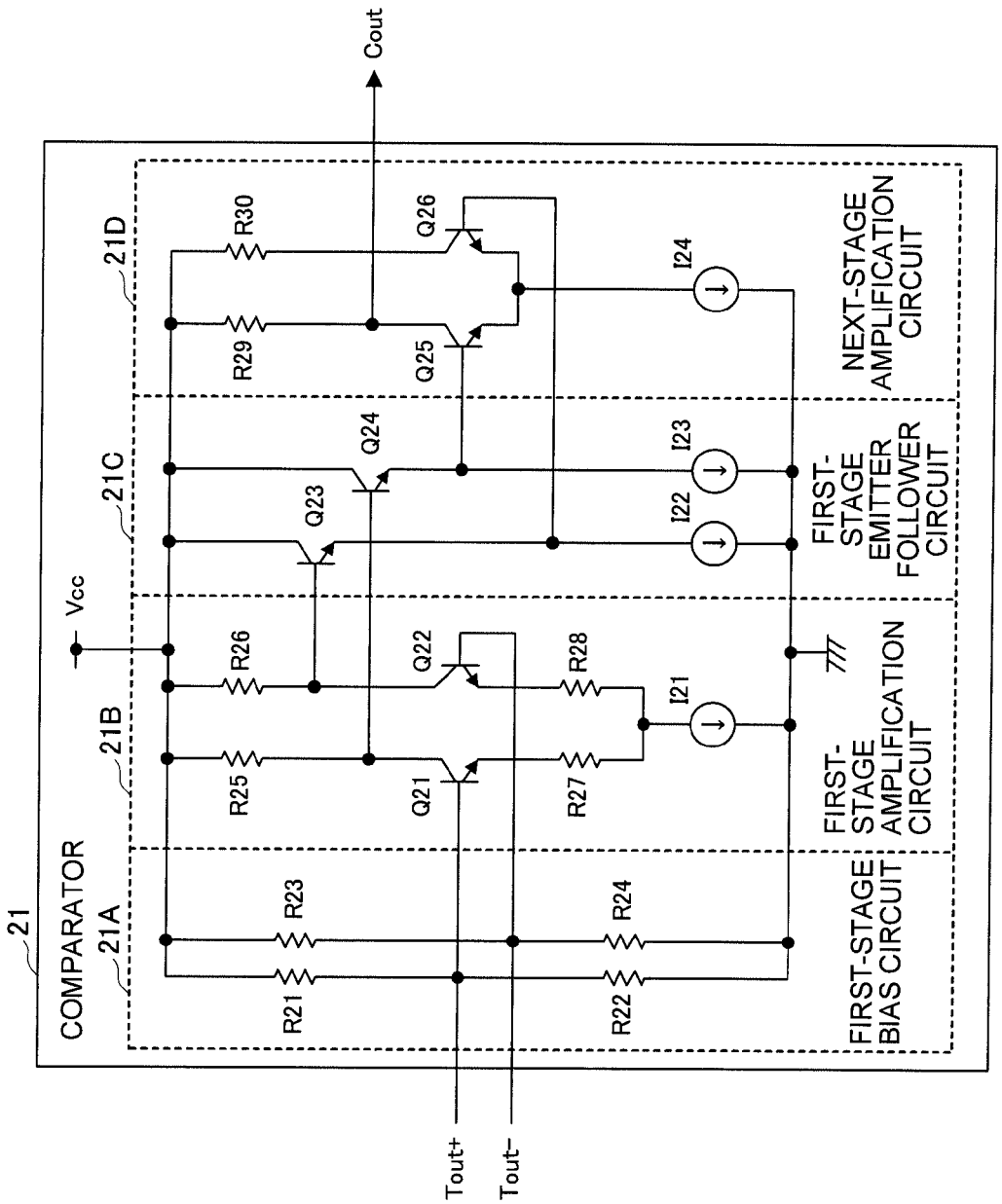
FIG. 10 is a circuit diagram showing the arrangement of a comparator used in an optical signal detection circuit according to a related art.
Figure 11:
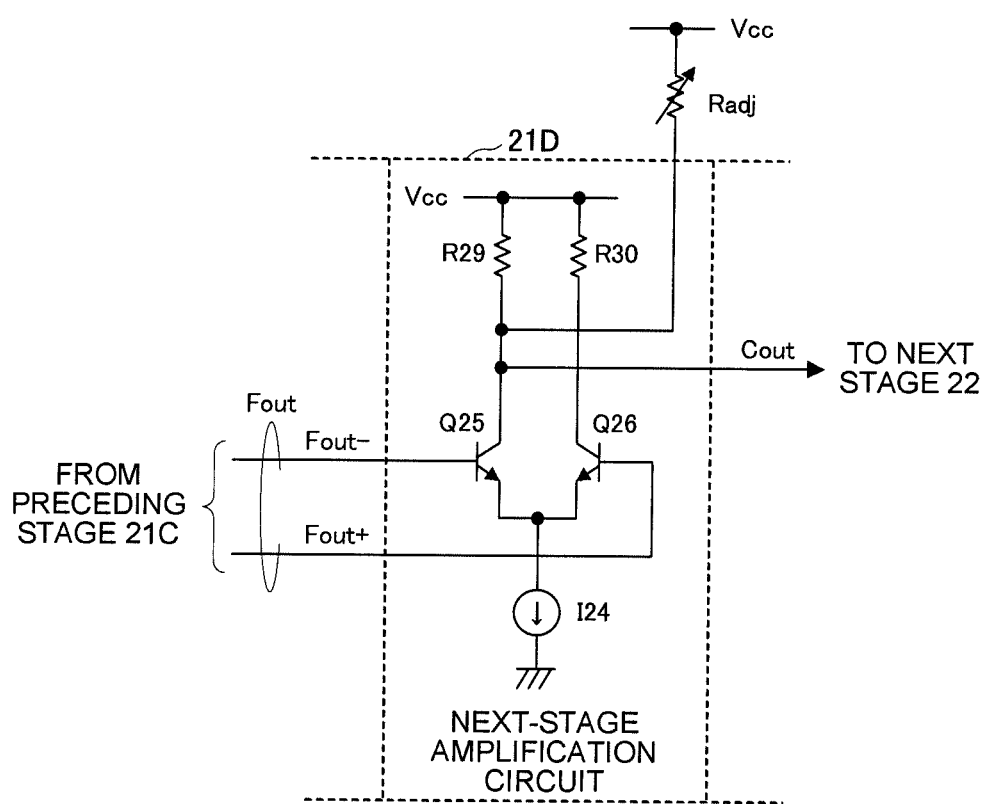
FIG. 11 is a circuit diagram showing an example of optical signal detection sensitivity adjustment in the comparator.

An optical signal detection circuit according to the fourth embodiment of the present invention will be described next with reference to FIG. 8.

The optical signal detection circuit includes an amplification circuit 11 and a comparator 12, as in the first embodiment. As shown in FIG. 8, the amplification circuit 11 includes a first-stage bias circuit 11A, a first-stage amplification circuit 11B, a first-stage emitter follower circuit 11C, a next-stage amplification circuit 11D, a current addition circuit 11H, and a next-stage emitter follower circuit 11F.

In the first embodiment, the current addition circuit 11E provided in the amplification circuit 11 of the optical signal detection circuit 10 includes the two transistors Q7 and Q8 that form a differential pair. The collector terminals of the transistors Q7 and Q8 are connected to the collector terminals of the transistors Q5 and Q6 of the next-stage amplification circuit 11D. On the other hand, the current addition circuit 11H of the amplification circuit 11 used in the optical signal detection circuit according to this embodiment includes a current source I9 that is connected to the collector terminal of one of transistors Q5 and Q6 of the next-stage amplification circuit 11D and has a current value to be adjusted in accordance with an adjusted voltage value from an external adjusted voltage source Vadj.

Note that the circuits other than the current addition circuit 11H are the same as in the first embodiment and denoted by the same reference numerals, and a detailed description thereof will be omitted.

In this embodiment, the current source I9 included in the current addition circuit 11H is connected to the collector terminal of the transistor Q6 of the next-stage amplification circuit 11D. The current source I9 adds a predetermined current to only the DC load current flowing to a load resistor R10 out of load resistors R9 and R10 of the next-stage amplification circuit 11D. Hence, the DC bias of a negative-phase signal Aout− generated by the load resistor R10 out of a positive-phase signal Aout+ and the negative-phase signal Aout− of a differential output signal Aout of the next-stage amplification circuit lowers.

The magnitude of the current added to the DC load current flowing to the load resistor R10 can be adjusted in accordance with the adjusted voltage value from the external adjusted voltage source Vadj. It is therefore possible to change the difference between the positive-phase signal Aout+ and the negative-phase signal Aout−, that is, the offset voltage by adjusting the DC bias of the negative-phase signal Aout−.

Extension of Embodiment

The present invention has been described above with reference to the embodiments. However, the present invention is not limited to the above embodiments. Various changes and modifications understandable by those who are skilled in the art can be done for the arrangements and details of the present invention without departing the scope of the present invention. The embodiments can also arbitrarily be combined.

EXPLANATION OF THE REFERENCE NUMERALS AND SIGNS

100 . . . optical receiver, PD . . . photodiode, TIA . . . transimpedance amplifier, LA . . . limiting amplifier, EF . . . emitter follower circuit, MA . . . main amplification circuit group, 10 . . . optical signal detection circuit, 11 . . . amplification circuit, 11A . . . first-stage bias circuit, 11B . . . first-stage amplification circuit, 11C . . . first-stage emitter follower circuit, 11D . . . next-stage amplification circuit, 11E, 11H . . . current addition circuit, 11F . . . next-stage emitter follower circuit, 11G . . . next-stage bias circuit, 12 . . . comparator, 13 . . . analog holding circuit, 13A . . . latch circuit, 14 . . . output buffer, C, C11, C12 . . . coupling capacitor, Dh . . . diode, Ch . . . holding capacitor, Rh . . . discharging resistor, Rs . . . variable resistor, Q1-Q10 . . . transistor, R1-R18 . . . resistive element, I1-I9 . . . constant current source, Pin . . . optical signal, Iin . . . photocurrent signal, Tout . . . electrical signal, Tout+ . . . positive-phase signal, Tout− . . . negative-phase signal, Fout . . . first-stage output signal, Fout+ . . . positive-phase signal, Fout− . . . negative-phase signal, Nout . . . next-stage amplified signal, Nout+ . . . positive-phase signal, Nout− . . . negative-phase signal, Aout . . . differential output signal, Aout+ . . . positive-phase signal, Aout− . . . negative-phase signal, Cout . . . comparison output signal, Hout . . . holding output signal, SD . . . optical signal detection signal, Rout . . . reception output, Vcc . . . power supply potential, GND . . . ground potential, Vset . . . set voltage source, Vadj . . . adjusted voltage source

The invention claimed is:

1. An optical signal detection circuit comprising:
an amplification circuit that differentially amplifies a positive-phase signal and a negative-phase signal of an electrical signal including pulses corresponding to a pulse train of an optical signal and outputs a differential output signal;
a comparator that compares a voltage value of the positive-phase signal of the differential output signal with a voltage value of the negative-phase signal and outputs a pulsed comparison output signal corresponding to a comparison result; and
a holding circuit that outputs an optical signal detection signal representing presence/absence of input of the optical signal based on the pulsed comparison output signal,
said amplification circuit comprising:
first and second load resistors that have one-terminal sides connected to a power supply potential and generate the positive-phase signal and the negative-phase signal of the differential output signal, respectively; and
a current addition circuit that adjusts a DC load current flowing to at least one of said first and second load resistors in accordance with an adjusted voltage value from an external adjusted voltage source and adjusts a difference between a DC bias of the positive-phase signal of the differential output signal and a DC bias of the negative-phase signal,
wherein said current addition circuit comprises a current source that is connected to the other terminal of one of said first and second load resistors and has a current value to be controlled in accordance with the adjusted voltage value.

2. An optical signal detection circuit according to claim 1, wherein said current addition circuit comprises:
a first transistor having a first input/output terminal connected to the other terminal of one of said first and second load resistors and a control terminal receiving the adjusted voltage value;
a second transistor that has a first input/output terminal connected to the other terminal of the other of said first and second load resistors, a control terminal receiving a predetermined voltage value, and a second input/output terminal connected to a second input/output terminal of said first transistor, and forms a differential pair with said first transistor; and a constant current source connected to a node of the second input/output terminal of said first transistor and the second input/output terminal of said second transistor.

3. An optical signal detection circuit according to claim 1, wherein said holding circuit comprises:

an analog holding circuit that comprises a holding capacitor to be changed by the pulsed comparison output signal and a discharging resistor connected in parallel to said holding capacitor and removes charges held in said holding capacitor by said discharging resistor, thereby outputting a holding output signal that changes in accordance with the presence/absence of input of the optical signal; and an output buffer that shapes the holding output signal into a digital logic signal and outputs the optical signal detection signal.

4. An optical signal detection circuit according to claim 3, wherein said output buffer comprises a Schmitt trigger inverter that shapes, based on a hysteresis characteristic, the holding output signal obtained by said analog holding circuit and outputs the holding output signal.

5. An optical signal detection circuit according to claim 1, wherein said holding circuit comprises a latch circuit that latches the pulsed comparison output signal and outputs the optical signal detection signal.

6. An optical signal detection circuit according to claim 1, wherein said amplification circuit further comprises:

a first-stage amplification circuit that differentially amplifies the positive-phase signal and the negative-phase signal of the electrical signal and outputs a first-stage output signal;

an impedance adjustment circuit that has an output impedance lower than the output impedance of said first-stage amplification circuit and outputs the first-stage output signal from said first-stage amplification circuit;

a next-stage bias circuit that is AC-coupled to said impedance adjustment circuit by a coupling capacitor, gives a DC bias to each of a positive-phase signal and a negative-phase signal of the first-stage output signal input via the coupling capacitor, and outputs the positive-phase signal and the negative-phase signal; and a next-stage amplification circuit that differentially amplifies the positive-phase signal and the negative-phase signal of the first-stage output signal, which are DC-biased by the next-stage bias circuit, and outputs the differential output signal, said next-stage amplification circuit comprising said first and second load resistors that generate the positive-phase signal and the negative-phase signal of the differential output signal, respectively.

7. An optical receiver comprising:

a photoelectric conversion element that photoelectrically converts an optical signal formed from a pulse train and outputs a photocurrent signal;

a transimpedance amplifier that amplifies the photocurrent signal and outputs an electrical signal including pulses corresponding to the pulse train;

a limiting amplifier that amplifies the electrical signal and outputs a reception output including pulses having a predetermined amplitude; and an optical signal detection circuit that detects presence/absence of input of the optical signal based on the electrical signal, said optical signal detection circuit comprising:

an amplification circuit that differentially amplifies a positive-phase signal and a negative-phase signal of the electrical signal and outputs a differential output signal;

a comparator that compares a voltage value of the positive-phase signal of the differential output signal with a voltage value of the negative-phase signal and outputs a pulsed comparison output signal corresponding to a comparison result; and a holding circuit that outputs an optical signal detection signal representing the presence/absence of input of the optical signal based on the pulsed comparison output signal, and said amplification circuit comprising:

first and second load resistors that have one-terminal sides connected to a power supply potential and generate the positive-phase signal and the negative-phase signal of the differential output signal, respectively; and a current addition circuit that adjusts a DC load current flowing to at least one of said first and second load resistors in accordance with an adjusted voltage value from an external adjusted voltage source and adjusts a difference between a DC bias of the positive-phase signal of the differential output signal and a DC bias of the negative-phase signal, wherein said current addition circuit comprises a current source that is connected to the other terminal of one of said first and second load resistors and has a current value to be controlled in accordance with the adjusted voltage value.

8. An optical signal detection circuit comprising:

an amplification circuit that differentially amplifies a positive-phase signal and a negative-phase signal of an electrical signal including pulses corresponding to a pulse train of an optical signal and outputs a differential output signal;

a comparator that compares a voltage value of the positive-phase signal of the differential output signal with a voltage value of the negative-phase signal and outputs a pulsed comparison output signal corresponding to a comparison result; and a holding circuit that outputs an optical signal detection signal representing presence/absence of input of the optical signal based on the pulsed comparison output signal, said amplification circuit comprising:

first and second load resistors that have one-terminal sides connected to a power supply potential and generate the positive-phase signal and the negative-phase signal of the differential output signal, respectively; and a current addition circuit that adjusts a DC load current flowing to at least one of said first and second load resistors in accordance with an adjusted voltage value from an external adjusted voltage source and adjusts a difference between a DC bias of the positive-phase signal of the differential output signal and a DC bias of the negative-phase signal, wherein said holding circuit comprises:

an analog holding circuit that comprises a holding capacitor to be changed by the pulsed comparison output signal and a discharging resistor connected in parallel to said holding capacitor and removes charges held in said holding capacitor by said discharging resistor, thereby outputting a holding output signal that changes in accordance with the presence/absence of input of the optical signal; and an output buffer that shapes the holding output signal into a digital logic signal and outputs the optical signal detection signal.

9. An optical signal detection circuit according to claim 8, wherein said current addition circuit comprises:
a first transistor having a first input/output terminal connected to the other terminal of one of said first and second load resistors and a control terminal receiving the adjusted voltage value;
a second transistor that has a first input/output terminal connected to the other terminal of the other of said first and second load resistors, a control terminal receiving a predetermined voltage value, and a second input/output terminal connected to a second input/output terminal of said first transistor, and forms a differential pair with said first transistor; and
a constant current source connected to a node of the second input/output terminal of said first transistor and the second input/output terminal of said second transistor.

10. An optical signal detection circuit according to claim 8, wherein said output buffer comprises a Schmitt trigger inverter that shapes, based on a hysteresis characteristic, the holding output signal obtained by said analog holding circuit and outputs the holding output signal.

11. An optical signal detection circuit according to claim 8, wherein said holding circuit comprises a latch circuit that latches the pulsed comparison output signal and outputs the optical signal detection signal.

12. An optical signal detection circuit according to claim 8, wherein said amplification circuit further comprises:
a first-stage amplification circuit that differentially amplifies the positive-phase signal and the negative-phase signal of the electrical signal and outputs a first-stage output signal;
an impedance adjustment circuit that has an output impedance lower than the output impedance of said first-stage amplification circuit and outputs the first-stage output signal from said first-stage amplification circuit;
a next-stage bias circuit that is AC-coupled to said impedance adjustment circuit by a coupling capacitor, gives a DC bias to each of a positive-phase signal and a negative-phase signal of the first-stage output signal input via the coupling capacitor, and outputs the positive-phase signal and the negative-phase signal; and
a next-stage amplification circuit that differentially amplifies the positive-phase signal and the negative-phase signal of the first-stage output signal, which are DC-biased by the next-stage bias circuit, and outputs the differential output signal,
said next-stage amplification circuit comprising said first and second load resistors that generate the positive-phase signal and the negative-phase signal of the differential output signal, respectively.

13. An optical receiver comprising:
a photoelectric conversion element that photoelectrically converts an optical signal formed from a pulse train and outputs a photocurrent signal;
a transimpedance amplifier that amplifies the photocurrent signal and outputs an electrical signal including pulses corresponding to the pulse train;
a limiting amplifier that amplifies the electrical signal and outputs a reception output including pulses having a predetermined amplitude; and
an optical signal detection circuit that detects presence/absence of input of the optical signal based on the electrical signal,
said optical signal detection circuit comprising:
an amplification circuit that differentially amplifies a positive-phase signal and a negative-phase signal of the electrical signal and outputs a differential output signal;
a comparator that compares a voltage value of the positive-phase signal of the differential output signal with a voltage value of the negative-phase signal and outputs a pulsed comparison output signal corresponding to a comparison result; and
a holding circuit that outputs an optical signal detection signal representing the presence/absence of input of the optical signal based on the pulsed comparison output signal, and
said amplification circuit comprising:
first and second load resistors that have one-terminal sides connected to a power supply potential and generate the positive-phase signal and the negative-phase signal of the differential output signal, respectively; and
a current addition circuit that adjusts a DC load current flowing to at least one of said first and second load resistors in accordance with an adjusted voltage value from an external adjusted voltage source and adjusts a difference between a DC bias of the positive-phase signal of the differential output signal and a DC bias of the negative-phase signal,
wherein said holding circuit comprises:
an analog holding circuit that comprises a holding capacitor to be changed by the pulsed comparison output signal and a discharging resistor connected in parallel to said holding capacitor and removes charges held in said holding capacitor by said discharging resistor, thereby outputting a holding output signal that changes in accordance with the presence/absence of input of the optical signal; and
an output buffer that shapes the holding output signal into a digital logic signal and outputs the optical signal detection signal.

\* \* \* \* \*